(12) United States Patent
Flores et al.

(10) Patent No.: US 9,774,616 B2
(45) Date of Patent: Sep. 26, 2017

(54) THREAT EVALUATION SYSTEM AND METHOD

(71) Applicant: Oppleo Security, Inc., Albuquerque, NM (US)

(72) Inventors: Roderick A. Flores, Edgewood, NM (US); Britny Rolston, Idaho Falls, ID (US)

(73) Assignee: Oppleo Security, Inc., Albuquerque, NM (US)

( * ) Notice: Subject to any disclaimer, the term of this patent is extended or adjusted under 35 U.S.C. 154(b) by 349 days.

(21) Appl. No.: 13/928,178

(22) Filed: Jun. 26, 2013

(65) Prior Publication Data

US 2013/0347116 A1   Dec. 26, 2013

Related U.S. Application Data

(60) Provisional application No. 61/664,379, filed on Jun. 26, 2012.

(51) Int. Cl.
*G06F 17/30* (2006.01)
*H04L 29/06* (2006.01)

(52) U.S. Cl.
CPC ................ *H04L 63/1433* (2013.01)

(58) Field of Classification Search
CPC .................................. H04L 63/1433
See application file for complete search history.

(56) References Cited

U.S. PATENT DOCUMENTS

| | | | | |
|---|---|---|---|---|
| 8,166,553 | B2 * | 4/2012 | Kubota | G06F 21/552 705/38 |
| 8,769,412 | B2 * | 7/2014 | Gill | G06F 21/55 702/185 |
| 8,826,422 | B2 * | 9/2014 | Russell | H04L 12/585 709/217 |
| 2008/0229415 | A1 * | 9/2008 | Kapoor | G06F 21/55 726/22 |
| 2009/0089093 | A1 * | 4/2009 | Johnson | G06F 19/327 705/2 |
| 2012/0110174 | A1 * | 5/2012 | Wootton | G06F 21/564 709/224 |
| 2014/0108652 | A1 * | 4/2014 | Richard | G06F 11/3003 709/224 |
| 2014/0123278 | A1 * | 5/2014 | Thubert | H04L 63/1458 726/23 |

\* cited by examiner

*Primary Examiner* — Mohammed Waliullah

(57) ABSTRACT

Systems and methods of evaluation of threats to elements of a client computer application having a cyber reference library, an opponent catalog and a network model. The systems and methods produce a set of analyst reports evaluating the threats to the client computer application. One embodiment of the system for evaluating at least one threat to a client computer application has a threat evaluation engine which performs a plurality of algorithms, where each algorithm of has implementation specific needs for input into the individual algorithm, a threat evaluation results data store, a statistical analysis engine, and an analysis results data store.

32 Claims, 25 Drawing Sheets

THREAT EVALUATION SYSTEM AND METHOD

CROSS-REFERENCE TO RELATED APPLICATIONS

This application claims the benefit of U.S. Provisional Patent Application No. 61/664,379 having a filing date of Jun. 26, 2012. The disclosure and teaching of the application identified above is hereby incorporated by reference.

BACKGROUND OF THE INVENTION

Subject matter experts routinely perform analyses of the vulnerability of communications network-connected elements to unauthorized access. Typically, these examinations are performed in one of two ways.

The first method involves a direct measurement of the vulnerability of a service to a particular method of access, or threat. These evaluations, often called penetration tests, are performed from a variety of entry points as well as for a set of known threats. This approach has a number of drawbacks. To begin with, the examination is largely limited to threats that are well known to the evaluator. In practice, this also implies that the methods used to access the service are within the experience or capabilities of the analyst to be included in the analysis. Moreover the set of threats and evaluation points may be further limited so that they can be analyzed within a given set of time. Another drawback is that most communications network administrators are reluctant to allow an evaluator to execute threats that may cause a disruption or damage to the elements on their network.

Because penetration tests can be detrimental to a network, some users have migrated towards deterministic models of their networks to evaluate their security posture. One of the more popular approaches is to develop an attack graph that describes the various paths and states that an opponent might take when accessing a network. These models, while powerful, suffer from a number of issues as well. The primary concern is the complexity of such an approach. Where this is particularly apparent is when networks are dynamic. Services come and go as users start applications or when virtual machines are started or stopped. Moreover, sensitive data are continuously in flux as they are transmitted between services. These deterministic attack graph models cannot easily account for changes in the model as they do not include any sense of time. Even when a small degree of variability is allowed, these deterministic models would still require either a significant number of simplifying assumptions to be tractable, or conversely, a user would need to restrict the evaluation in the same ways penetration tests are limited.

The second more qualitative approach is for a subject matter expert to evaluate the threats to a particular target found in a network. The analyst assesses the security of the services from the target working outward looking for potential weaknesses. Specifically, the analyst considers methods that an opponent might use to access the target. They then document the scenarios that an attacker might undertake as well as possible mitigation strategies. This approach has many of the same drawbacks as the deterministic penetration test style. Most significantly, the examination is limited to threats that are well known to the evaluator. Moreover the methods for attack considered are limited to the experience and capabilities of the analyst. Yet this approach is favored by many experts because of its ability to identify risks to key targets rather than attempting to discover the myriad number of potential vulnerabilities that exist in a network at any one time. Unfortunately, the time intensive nature of this type of assessment only allows for the evaluation of a very limited number of incoming access points connecting to the target service. Moreover, the qualitative nature of this evaluation does not necessarily satisfy customers that it is accurate.

Yet, the sheer number of possible opponent-traversal combinations makes it difficult for an analyst to quantitatively examine each one individually. Breaking this mode of examination down further, to properly characterize the probability of unauthorized access to a network, the analyst must include a wide variety of routes to the target including acceptable-use approaches, leveraging service misconfigurations, or exploiting service vulnerabilities.

In addition to the opponent-traversal combinations there are further complications that an analyst must consider. Opponents can acquire items during an intrusion that improve their ability to reach a target. This type of action changes the threat scenario as it is played out. This evolving threat scenario may then also consist of thousands of similar, orchestrated individual attacks compounding its complexity.

Scenarios can adapt to network elements that change state regularly in expected ways, (e.g., routine data processing flow, changing policies and procedures) and in unexpected ways like device failures and crashes. And of course, these evolving states, unauthorized access scenarios and opponent-traversal combinations still fail to account for the constant chance of a zero-day vulnerability.

Once the combinations of these threat types (opponent-traversal, unauthorized access, and expected or unexpected state changes) have been identified and examined, this comprehensive threat profile must be compared against existing best practices and system administration procedures, taking in to account high-value targets related to business specific threats regarding security, confidentiality and trade secrets.

Any oversight, whether calculated or inadvertent, in this network data aggregation and analysis process can lead to compounded errors that render the entire process futile. Only with a tool that is able to sort, prioritize, and re-analyze scenarios again and again, is the analyst able to make best use of their subjective subject-matter expertise to produce quantitative results.

SUMMARY OF THE INVENTION

The present invention is a systems and method for performing the same to evaluate threats to elements of a client computer application having a cyber reference library, an opponent catalog and a network model. The systems and methods produce a set of analyst reports evaluating the threats to the client computer application. One embodiment of the system for evaluating at least one threat to a client computer application has a threat evaluation engine which performs a plurality of algorithms, where each algorithm of has implementation specific needs for input into the individual algorithm, a threat evaluation results data store, a statistical analysis engine, and an analysis results data store.

Categorization of a class of threats to the target from a broad range possible threats stored in the system to readily analyze and report on possible threats.

Other and further objects of the invention, together with the features of novelty appurtenant thereto, will appear in the course of the following description.

BRIEF DESCRIPTION OF THE SEVERAL VIEWS OF THE DRAWING

For a better understanding of the present invention, reference may be made to the accompanying drawings in which.

DETAILED DESCRIPTION OF THE INVENTION

Figure 1:
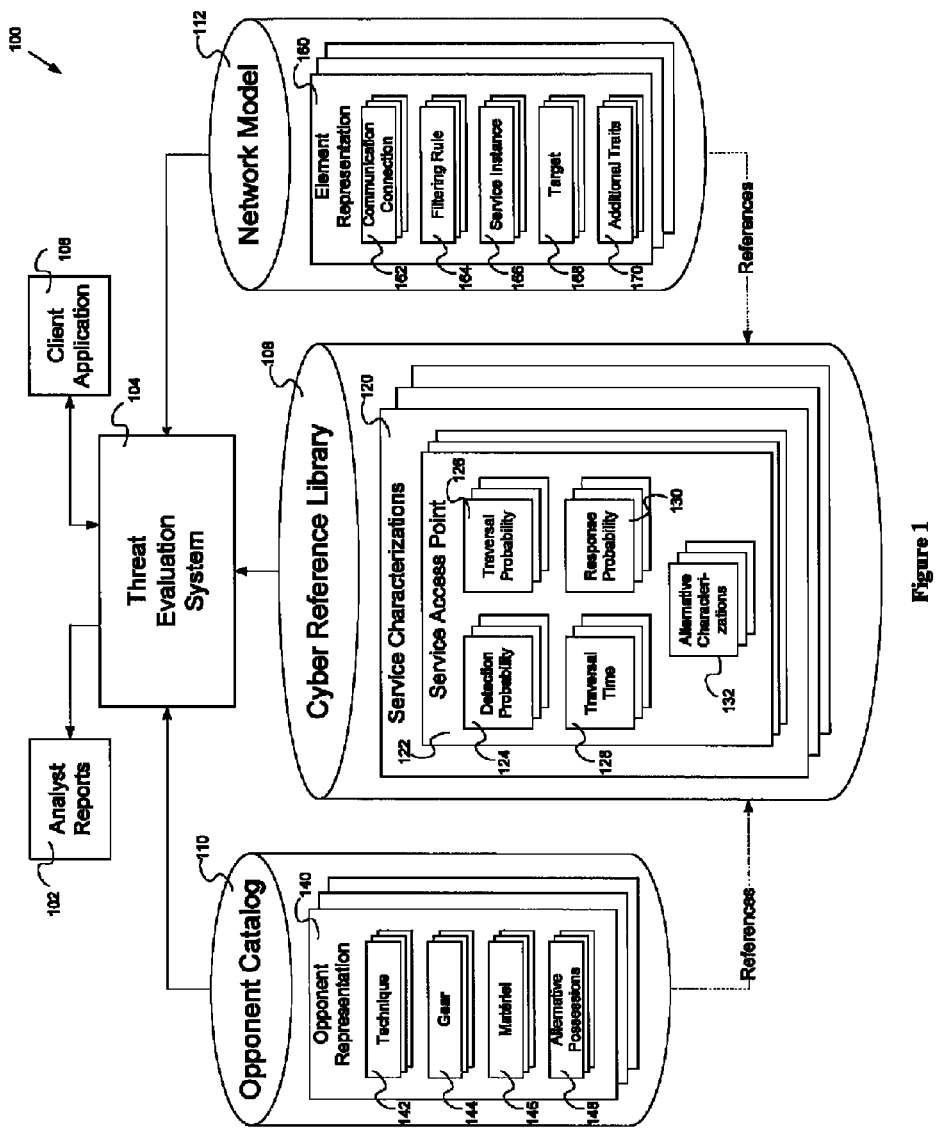
FIG. 1 is a top-level diagram of a system architecture according to embodiments of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps require physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g. electronic) quantities within the computer system's registers and memories into other data similarly represented as physical quantities within the computer system memories or registers or other such information storage, transmission or display devices.

In the Figures of the present invention, the same reference number is used throughout to refer to an identical component that appears in multiple Figures. Signals and connections may be referred to by the same reference number or label, and the actual meaning will be clear from its use in the context of the description. Also, please note that the first digit(s) of the reference number for a given item or part of the invention should correspond to the Figure number in which the item or part is first identified.

The description of the various embodiments is to be construed as exemplary only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a top-level diagram of system architecture 100 according to embodiments of the invention. Some embodiments of the invention include a client application 106 communicably coupled to a threat evaluation system 104 that produces a set of analyst reports 102 that present the calculation results to the user. The evaluation system in turn is communicably coupled to a cyber-reference library 108, opponent catalog 110, and network model datastore 112. Various mechanisms may be used to communicably couple the client application 106 to threat evaluation system 104, cyber-reference library 108, opponent catalog 110, and network model datastore 112. For example, a wired or wireless network may connect the threat evaluation system 104 to cyber reference library 108. Alternatively, cyber reference library 108 may reside on the same system as threat evaluation system 104, in which case various interprocess communications mechanisms may be used. Further, the threat evaluation system 104 may communicate with cyber reference library 108 over the Internet. The embodiments are not limited to any particular method of communicably coupling the various components.

Opponent Catalog

In certain embodiments, the opponent catalog 110 is a reference library containing opponent representations 140 having a set of actors that represent the threats that most commonly attempt to gain unauthorized access to elements in an electronic communications network. In other embodiments, the opponent catalog might contain a set of threats representing any assemblage that a user might wish to model such as a particular criminal enterprise, activist community, or any group with both the capability and the intent to persistently and effectively target a specific entity (advanced persistent threat). Because this invention is not restricted to defensive analysis, still other embodiments of the opponent catalog could contain the set of threats representing the offensive capabilities of the user's team.

Each opponent representation 140 could have a set of techniques 142 that could be used during an attempt to access a service instance 166 in certain aspects of the invention. A technique represents the approach to gaining unauthorized access to a network. There are any number of mechanisms that might be used to gain unauthorized access including data leakage attacks, resource depletion, injection, spoofing, time and state attacks, abuse of functionality, probabilistic techniques, exploitation authentication, data structure attacks, resource manipulation, physical security attacks, network reconnaissance, social engineering, and supply chain attacks. The invention is not limited to these classifications and could be used by someone skilled in the art to analyze any existing or emergent mechanisms.

The mechanism of an attack may have varying complexity. A simple attack may consist of a single traversal of a service access point such as an authentication against a simple application. However, many attacks are multi-component such that they span any number of services located on a single as well as multiple nodes. The key concept for these multi-component attack mechanisms is that they only require a single action by the attacker irrespective of the complexity of the path that is traversed. For instance, a SQL-Injection attack that requires the traversal of several services starting from an application, through a switch, and then on to a database server and back again only requires the opponent to initiate a single action. Conversely, a multistage attack mechanism requires the opponent to change techniques at particular pivot points within a decision timeline. This type of approach often occurs where trust boundaries are crossed. Consider an attack whose point of origin in an emplacement of a bot onto a workstation using a poisoned website. The bot then quietly logs keystrokes looking for authentication credentials. Once the opponent has gained the necessary information, the bot is then tasked with crossing a trust boundary and infecting itself onto the remote system, hopefully into a more privileged location on the network. This process of escalation of privileges could continue for some time, repeatedly switching techniques of attack until the target has been reached. Certain embodiments of the invention will support each of these varying attack mechanism complexities.

Any of these mechanisms can be used to achieve a variety of attack impacts or goals. These include spoofing, tampering, repudiation, information disclosure, and elevation of privilege. The invention will, in certain embodiments, use the set of attacks selected by an opponent in combination with the most damaging impacts to change the probability weighting used in the threat evaluation. Of course, the impacts listed here are exemplary. As such, the invention could be applied to any types of impacts that a person skilled in the art might consider.

Techniques, in some embodiments, might be broken out into the skill levels that an opponent might bring to bear during an attack. For example, execution of a zero-day attack against a service might be limited to actors with a highly developed skill-set. Another technique could represent the same zero-day attack with significantly lower chance of success because it is executed by a person with fewer capabilities. Another technique might signify the resources that an opponent can leverage. As an illustration, an opponent could have a distributed denial of service technique that could result in an impact to the business where customers would be unable to connect to an e-commerce website. While most individuals skilled in the art possess the skill to execute this type of attack, few have the necessary resources necessary to successfully accomplish it. Techniques might also be grouped around other capabilities such as using government agencies to affect the outcome of an attack. For instance, a government official could use their influence to deny upstream network connectivity to a site. Clearly there are no limits to the type of techniques that may be used to describe opponent representations. Indeed, the diversity of black-hat actors including organized crime, corporate espionage, advanced persistent threats, as well as political activists to name a few, behooves analysts to thoroughly enumerate variants of techniques based upon individual sophistication.

In some embodiments, opponent representations 140 may carry gear 144 which can be used to increase the probability that an opponent may traverse a service instance 166. Gear may encompass any number of electronic communication network-usage concepts. For example, gear may represent authentication and/or authorization tokens for a particular domain. An opponent instance carrying one of these tokens would easily traverse service instances that authenticate against the domain. Moreover, because users often reuse or use similar passwords across authentication domains, such a token might aid an opponent in gaining access to other protected services where this token may not be effective. Gear might also represent knowledge that could be used to obtain very specific information from an application. This knowledge could be something as complex as the structure of data in a database or the information concerning the specific applications needed to obtain the target data with as low a probability of detection as possible. Because there are no limits to the types of gear that an opponent representation may carry, they have not been enumerated here. Having said that, the invention is not limited to the embodiments described herein.

The use of gear is not restricted to those items initially provided to an opponent representation. Rather, gear germane to a successful service-access point 122 traversal may be provided. For instance, an opponent who successfully guesses a user password might be given a piece of gear for the appropriate security domain, a portion of a network representing a single authentication and authorization region with its own unified management strategy. Likewise, an opponent that successfully traverses a service-access point representing a vulnerability might receive a token that significantly improves the probability of future accesses to related access points.

Certain embodiments will account for materiel 146 that an opponent might bring into or obtain while accessing services within a network. These items can be used to assess the business impact of unauthorized access to data. They could also be used to install undesirable data onto service characterizations 120. Further, materiel 146 might also be used to trigger detection events. For instance, an opponent downloading a dataset containing credit card numbers might be detected by a networking appliance. Alternatively, materiel used to install trojans or viruses may contain signatures that may be detected during a network access attempt. There is no limit to the types of materiel (i.e. data) that may be transmitted into or out of a network. Subsequently, not all of the possible embodiments have been enumerated here.

In still other embodiments of the invention, opponent representation 140 might allow alternative possessions 148 that can improve an opponent's ability to access services on a network. For example, an opponent might have physical access to certain elements in a network such as a keypad. On the other hand, an opponent might have an employee telephone book providing information useful towards accessing services on a network.

Cyber Reference Library

In some embodiments, cyber reference library 108 maintains one or more service characterizations 120. A service is a process capable of interacting with other processes across a communications network. A service characterization 120 is a model that describes the many approaches that a user has available to interact with a service. These models might represent a well known communications network enabled system, platform, or package such as those enumerated in the common platform enumeration naming scheme (http://cpe.mitre.org). Others might represent custom implementations that are not well-known in the user community. Alternative representations may aggregate a set of similar network-enabled systems or even a set user actions into a service characterization 120.

Individual service characterizations 120 model the processes on an element representation 160 that are capable of interacting with a communications network. For instance, a service characterization 120 might be created that represents the process that delivers web pages upon request from users. However, these models are not required to correspond directly with the services that might be found on actual network element. For example, the service characterization 120 might represent all of the means that a user has at their disposal for connecting to other networked services.

A service characterization 120 may contain the service-access points 122 that represent the sundry ways a user might connect to the service. In general, each service-access point 122 is a stochastic process containing a variety of distributions that define the possible outcomes of a network user's interaction with the service. A traversal probability distribution 126 could describe the likelihood that a particular interaction with a service will succeed. Some embodiments of the invention discriminate between ingress and egress paths to and from the service while others might simply consider the interaction as a single atomic operation. A traversal time distribution 128 could describe the amount of time required for the service interaction to take place. A detection probability distribution 124 could describe the likelihood that the interaction will be flagged as an unauthorized service access. Response probability distributions 130 might describe the likelihood and amount of time that an assessment of a detection event might require. Some embodiments allow for the existence of detection false-positives that could raise an alarm even if no detecting event occurred. A service-access point may contain still other alternative characterizations 132 that can be used to further refine the outcome of an interaction between an opponent and a service.

Each of the service-access point 122 modifiers can be affected by techniques 142, gear 144, materiel 146, and alternative possessions 148. For example, a skilled opponent with a particular technique 142 might be more capable of taking advantage of a weakness in a particular service characterization 120 than the majority of opponents. As such, the traversal probability 126 and detection probability 124 distributions associated with one or more of the service's access points 122 would be much more favorable to that opponent. Similarly, the traversal time distribution 128 might be shorter than for a less skilled user.

In some embodiments of the invention, the service characterization 120 model limits the scope of the service characterization in an effort to either simplify the evaluation or to focus on particular pattern of usage of the service. To illustrate, a service characterization of an electronic communications traffic routing service may not consider usage patterns that exploit implementation vulnerabilities in the service. This is but one of many service characterizations that would be evaluated by the system.

There are several types of access that can be made to a service: proper usage access points represent situations where the user is using the service in an expected way; misconfiguration access points correspond to situations where the user is able to access the service in ways that were not intended because the manager of the service failed to prevent the action; vulnerabilities represent situations where the service can be accessed in unintended ways by exploiting a flaw in the design of the service. As such, there should minimally be access points that represent how a service is expected to be used, the possibility that the service was configured in such a way that users are allowed unexpected access, and the probability that the service has a vulnerability that can be exploited by a user to gain unauthorized access. Of course the invention is not limited to these specific access characterizations as there may be any number of other ways to describe the type of interaction a user has with a service.

Figure 7:
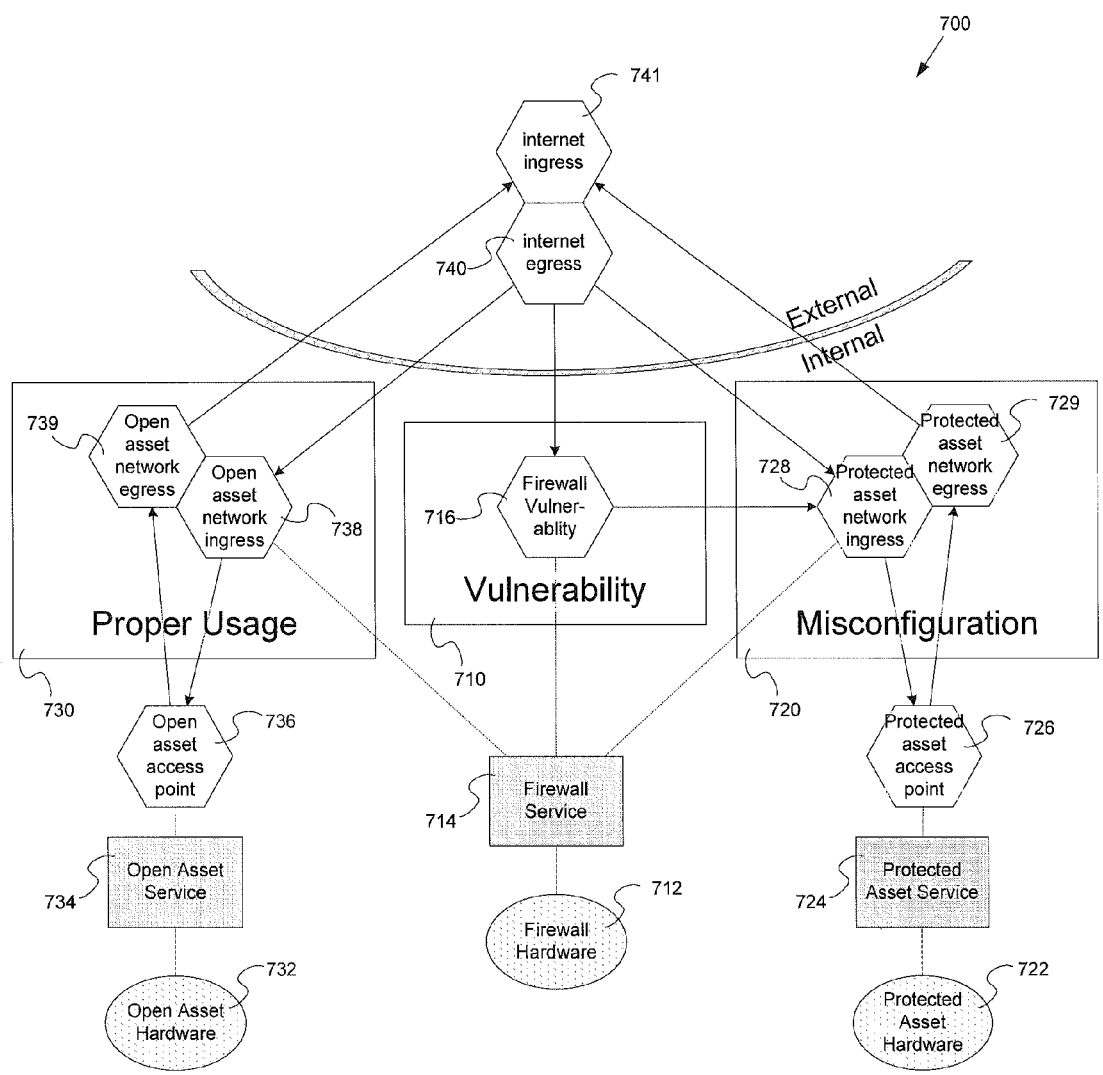
FIG. 7 is an illustration of the three basic types of service-access point operating on a basic network according to embodiments of the invention.

FIG. 7 contains a generalized example of these three types of access to a service. The network being modeled contains firewall hardware 712 that prevents external access to protected asset hardware 722 and limits external access to an open asset service 734. An opponent attempting to access a service running on the open asset hardware 732 would enter through a proper usage 730 type of access point. By design, the proper channel would have high probabilities of traversal both during ingress and egress for the opponent. An attempted access through this route would start by seeking egress from the internet 740 through the firewall open access network ingress 738 point and then onto the open asset access point 736. Once the interaction with the open asset service 734 is complete, the resulting data is then retrieved through the firewall's open asset network egress access point 739 onto the internet ingress access point 741.

Alternatively, the opponent could attempt to reach a service on the protected asset 722 itself. Ostensibly there should be no route to the protected asset service unless the firewall has a vulnerability 710 or misconfiguration 720 that inadvertently allows access. The probability of traversing the firewall vulnerability access point 716 should be modified by any known vulnerabilities for that particular service, the likelihood a previously unknown, or zero-day, vulnerability might exist for the service, as well as the probability that current security patches and configuration best practices will be applied given the policies and procedures of the system administrators. What is more, the traversal probability could be further modified by other factors. An opponent traversing this access point must also possess the necessary techniques to take advantage of the vulnerability without triggering detection events or causing a service failure. The effect of traversing the vulnerability is to increase the probability that the network is misconfigured to 100%. Instead, traversing the misconfiguration path relies on two distinct errors by the system administrator. The first mistake allows the opponent access through the protected asset network ingress access point 728 to the protected asset service-access point 726. The probability that this mistake exists typically is related to the frequency that changes are made to the firewall rule sets, the skill level of the administration staff, and the policies and procedures put in place to prevent such an error. As before, there may be other probability modifiers that are relevant to any particular instance. The second configuration error allows an opponent to traverse from the protected asset service-access point 726 to traverse to the protected access network egress access point 729, and then exiting to the internet ingress 741. This route is not always considered to be a configuration problem and therefore has a much higher probability of existing. Otherwise, the probability of this mistake occurring is influenced by the same factors as the ingress misconfiguration.

Returning to FIG. 1, the service characterization 120 can be referenced to describe the properties of a service instance 166. The embodiments of the invention are not limited to any particular service or means to characterize how a user might interface with said service.

Each service characterization 120 may be considered a separate piece of knowledge. In some embodiments, these discrete pieces of knowledge are related to one another in cyber reference library 108 by the use of numerical identification keys. In some embodiments, a service characterization 120 may serve as a template for another service characterization 120. In some embodiments, a general service characterization is the parent item and each characterization derived from it uses the id of the parent as its parent id. To illustrate, an example parent entry may have an id of 10008 with no parent id (e.g. a value such as 0, or nil or other predefined value) and the derived characterizations attached to this parent item have their own unique id and a parent id of 10008.

Network Model

A network model datastore 112 as seen in is an abstract representation of the approaches an individual might employ when attempting to gain access to elements on an electronic communications network. In the context of this invention, the model should be capable of representing how an individual might gain unauthorized access to protected assets on a network. These assets range from data, systems, to other network resources and are the targets of an attack. An opponent commonly applies a variety of techniques to either acquire data or gain access to those assets during their attack. Moreover, cyber reference library 108 and opponent catalog 110 have the ability to create characterization that consider the opponent's attack techniques and goals in such a way that they influence the type and scope of attack impact to the network owner.

An element is a piece of equipment capable of interacting over an electronic communications network that is used in the provision of a service. An element representation 160 is a model of one of these elements. Each element representation 160 may be considered a separate piece of knowledge. In some embodiments, network model datastore 112 maintains one or more element representations 160. Each element representation is capable of communicating with other element representations in a model. In some embodiments, the communication between elements is described by a communication connection 162. For example, an element might define the set of elements, called children, for which it manages networking messages. What is more, this element may also define a limited set of elements to which it may transmit communications packets. For example, firewalls are capable of restricting either the electronic communication packets that they may transmit or those that they may receive. As such, certain embodiments allow element representations to enforce filtering rules 164 that restrict the electronic communications packets that may pass through services on that the element. For instance, an element might not accept electronic communications messages from all of the other elements in a service. However, it may have an exception for those service representations with particular source IP addresses.

A target 168 may signify any number of items that either have a business, security, or technical impact if an unauthorized individual were to access them. A business impact could include access to personally identifiable information (e.g. social security numbers) or the modification of data on a website. A security impact might involve the release of information that could be used to compromise the security of an entity such as a nation-state. A technical impact is one that is not immediately observable by the user community. However, it might provide an opponent a bridgehead to help further their intrusion into the network. It might also result in a reduced capability on the element where the service was compromised. Moreover, partial success in the lens of the opponent is likely to be a major issue for the network administrators. There are certainly other types of business, security, or technical impacts that might define a target.

Certain element representations 160 for a network can have targets 168 associated with them. The element for which the analysis is being performed will have a target, by definition. However, in certain embodiments, the threat evaluation engine may also track the impacts that an intrusion might produce for the non-targeted service. For example, there might be a given business impact for accessing restricted data on an element. However that impact might become even more pronounced if that data is successfully modified or removed, either partially or completely, from the control of the network administrators. The difference illustrated in this example is the equivalent between an unauthorized person seeing a set of account numbers or the same individual downloading a partial or complete set of those same account numbers for future use.

Lastly, the embodiments described above are exemplary. As such, an element representation might contain any number of additional traits 170 that help define the network model. These traits could help describe how the actual network is configured, further refine the model describing how an opponent might communicate with a network element, describe targets more fully, or better elucidate other features such as security domains found in the network model.

Threat Evaluation System

Figure 2:
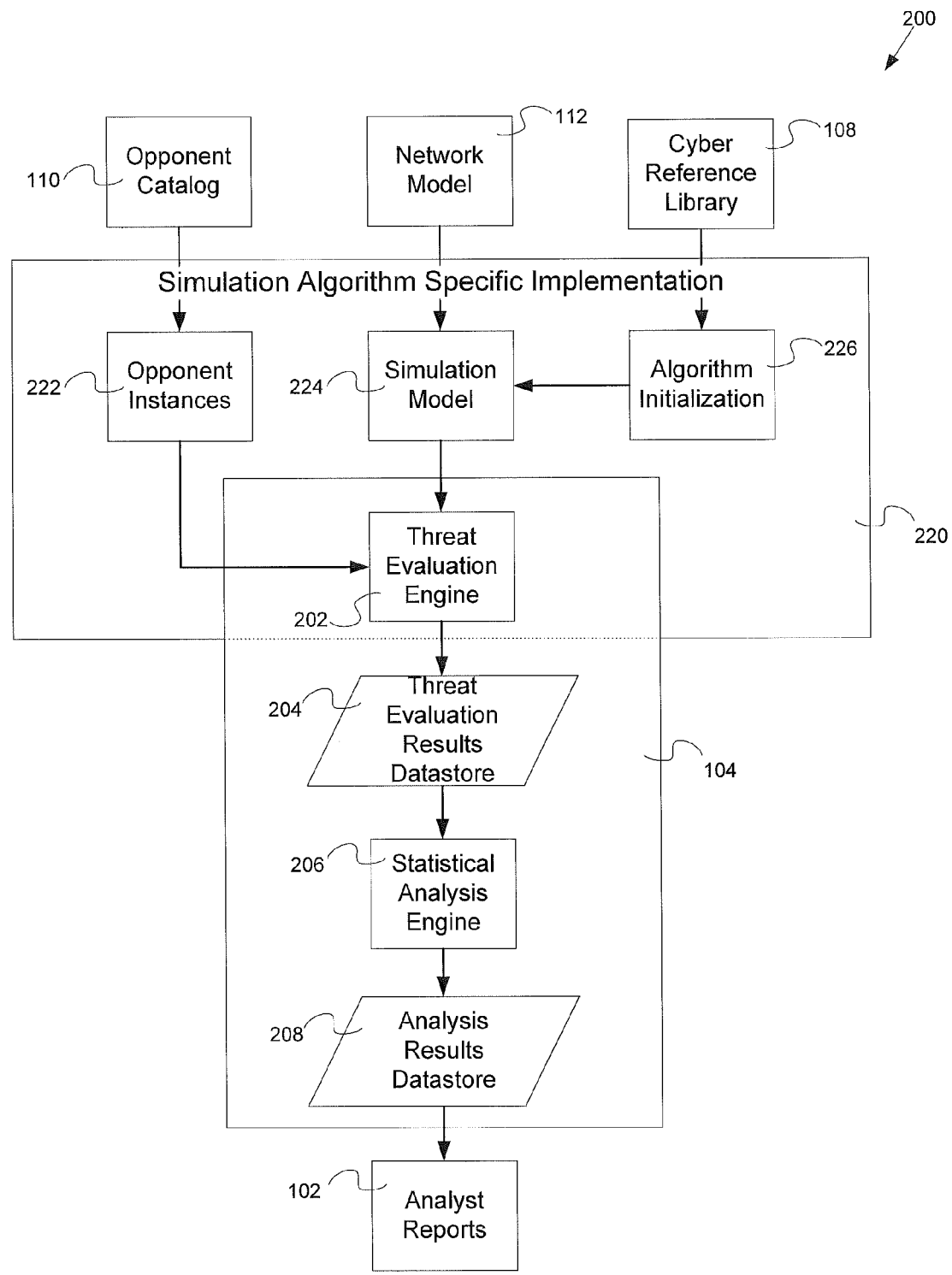
FIG. 2 is a high-level flowchart illustrating a method for evaluating the probability of unauthorized access to elements in a cyber network from a specified set of threats according to embodiments of the invention.

FIG. 2 displays an embodiment of threat evaluation system 104. This system performs a repeatable and exhaustive analysis of a specified threat to a target reachable through a communications network. It typically consists of but is not limited to a threat evaluation engine 202, threat evaluation results data store 204, a statistical analysis engine 206, and an analysis results data store 208.

The threat evaluation engine 202 can perform its calculations using any number of algorithms. As expected, each individual algorithm will have implementation specific needs 220 for its inputs. Specifically, an instance will be created out of the network model 112 references to the cyber reference library 108. This process may require an algorithm specific initialization 226 of the reference library elements. For instance, a stochastic Monte Carlo approach would correspond to making one or more random draws for each of the probability distributions in the cyber reference library 108 that are referenced by items in the network model datastore 112. Similarly, items from the opponent catalog 110 may also require algorithm specific initialization to create opponent instances 222. Moreover, the algorithm specific initialized values 226 are applied to the simulation model 224 to dereference.

There are a variety of simulation algorithm specific implementations 220 that could be used by the threat evaluation system. Monte Carlo algorithms use random samples of input parameters to investigate the behavior of complex systems. If a Monte Carlo approach were to be used for the system, the cyber reference library 108 and opponent catalog 110 shown in FIG. 1 would contain probability distribution functions. The algorithm initialization 226 and the creation of opponent instances 222 would involve making a set of random draws. The threat evaluation engine 202 would also make additional random draws, as necessary. The threat evaluation results 204 would consist of probabilities of an outcome.

Bayesian algorithms enable reasoning with propositions whose outcome is uncertain. They allow for the estimation of an unknown probability density function using incoming data and a model. These algorithms could be used to predict the probabilities in the cyber reference library 108 and opponent catalog 110 displayed in FIG. 1. The algorithm initialization 226 and the creation of opponent instances 222 might involve the updating of those calculated probabilities with the most recent relevant data. The threat evaluation engine 202 would use these probabilities to produces direct calculations of the probability of a given outcome.

Evolutionary algorithms use a population-based heuristic optimization that mimics a process of natural selection. These algorithms require the definition of a fitness function that determines the conditions under which the populations exists. In general, this fitness function could seek to optimize a solution towards any desired set of conditions. One possible approach would be to use a publicly available data set such as the DARPA Intrusion Detection Data Sets located at MIT's Lincoln Laboratory to define fitness. This function would in turn be used to develop a set of rules that would mimic the probability of a successful intrusion. In this implementation, the cyber reference library 108 and opponent catalog 110 located in FIG. 1 would become a set of rules for use by a rule-based system. The algorithm initialization 226 and the creation of opponent instances 222 might involve the connection of rules from these reference sets to the appropriate models.

The invention is not restricted to the exemplary implementations of these three classes of algorithms. There are a wide range of evolutionary algorithms such as genetic, firefly, and artificial immune systems approaches that could be used in this role. Moreover, any number of alternative algorithms could be implemented including neural networks, rules engines, and swarm algorithms.

For brevity's sake, the remainder of the detailed discussion of the invention will focus solely on a Monte Carlo algorithm. Not only is this approach a good choice for the problems we seek to solve, its simplicity makes it easy to describe. Having said that, this choice does not indicate that the invention is restricted to implementation using a Monte Carlo approach. Rather, any algorithm that is capable of producing a risk profile for a modeled network would be sufficient to the task.

Monte Carlo Threat Evaluation Engine

Modeling of potential unauthorized entry points into a network has a great deal of uncertainty in a number of dimensions. These include but are certainly not limited to the following: hardware and software updates; the interplay between the software and services installed on a network node; the detection devices located on a network; network and host-based intrusion detection; the policies and procedures followed for management of a network and the individual elements on it; and importantly, the skill levels of the individuals managing the network.

Monte Carlo methods are especially well suited for these types of situations where no obvious deterministic solution exists. They are able to sample all possible outcomes of the input probability distributions. Indeed, the use of probability distributions as input produces distribution functions as outputs from the simulation. Thus, the results contain a range of possible outcomes including the best, average, and worst case scenarios.

Generally speaking, determining the probability that an opponent might gain unauthorized access to any given target is exceedingly difficult. There are a wide variety of possible opponent techniques 142 that could be used to arrive at a target. There is also a significant range in the possible configurations of the element representations 160 present in the network that dictate how the opponent can traverse the service-access points 122. Additionally, there may be a number of security measures such as detection systems 124 or filtering rule-sets 164 put in place to prevent unauthorized access to the target or to other elements that have forms of access to the target. Moreover, there may be a set of security domains 170 that further complicate access to the target. Finally, there could be still more ways that an attempt to gain access to a target might be affected.

Each of these factors is largely independent from the others. For instance, two web servers in a cluster that are expected to have the same configuration have a non-zero chance that these two elements have diverged since their original configuration. As such, the service characterizations for these elements represent two distinct paths that an opponent might take towards the target. Consider a situation where an administrator makes a change required for the proper operation of an application on these web servers but also neglects to make the same exact change on both. Similarly, an administrator might apply a security patch to one web server and completely forget to patch the second. Certainly, administrators that follow policies that are designed to avoid this outcome will have a lower likelihood of this happening while those who follow more impromptu management process have a much higher chance. Ultimately, the interplay between each of these pieces makes the direct calculation of risk by an analyst effectively impossible. What is more, aggregating the potentially different network nodes into a single element as is done in most tractable attack graph solutions causes the loss of a significant amount of fidelity. It is inappropriate to assume that all similar items in a network share equal probabilities of allowing unauthorized access. Instead, the threat evaluation engine is used to comprehensively calculate the probability that an opponent will be able to traverse a series of service-access points required to reach a given target.

Before starting a simulation, the threat evaluation engine 202 shown in FIG. 2 must be provided with a target on a particular element in the network model as well as any other simulation control parameters. The engine should also be provided with a set of opponents selected from the catalog as well as a specific cyber reference library. The engine can then either perform its calculation in a single-threaded manner, FIG. 3, or an approach that could be extended either to multiple threads or distributed across multiple compute nodes, FIG. 4.

Figure 3:
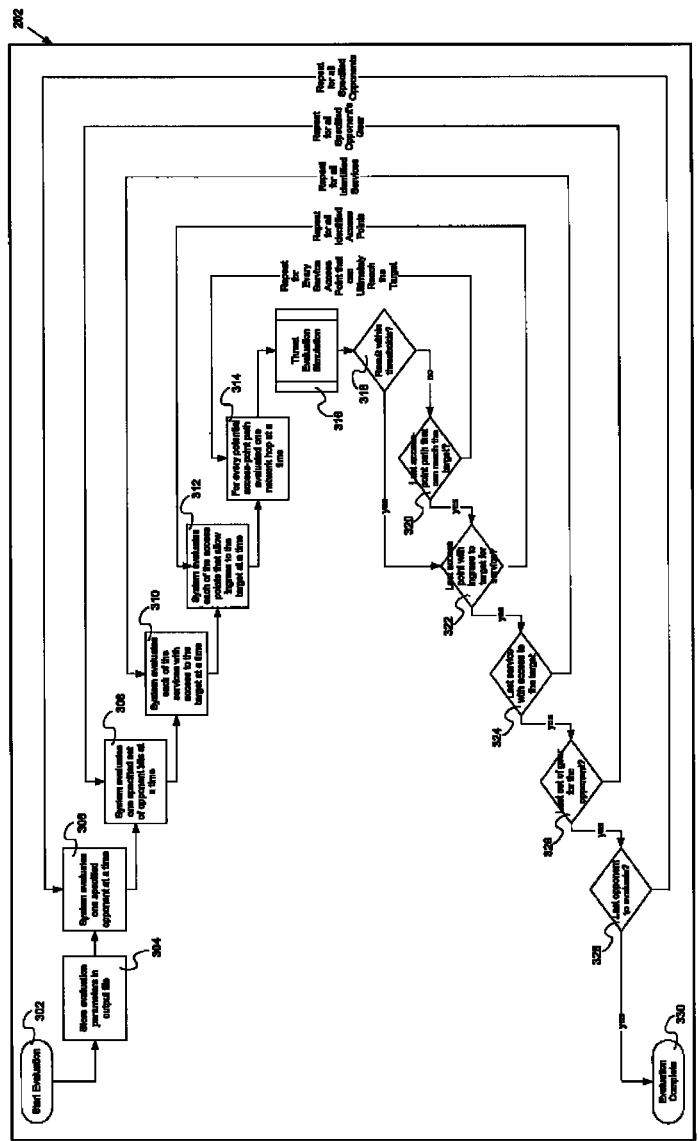
FIG. 3 is a flowchart providing detail about a serial implementation of the threat evaluation engine portion of the threat evaluation system according to embodiments of the invention.

FIG. 3 displays the single-threaded approach to the implementation of the threat evaluation engine 202. The first step in this process is to store the evaluation parameters specified by the user into the output file 304 so that the user can distinguish result sets from one another. It then begins by looping over each of the specified opponents 306 at a time followed by a second loop over the sets of gear 308 that each of the opponents might be provided for the intrusion into a network. The user might provide gear that they would anticipate the opponent could obtain during a simulation of a network model with a broader context. This could include gear that could be obtained within the scope of the assets under the user's control or gear that an opponent would need to obtain elsewhere. Next, the system evaluates each of the set of services that have direct access to the target 310. These are the services on the same element as the target. The evaluation then considers each of the access points that provide ingress to the target 312. Next, the engine evaluates all of the possible paths into the access point in question one network hop at a time 314. Multi-component attacks that span multiple service-access points must switch their ingress to egress on the target node to qualify for this analysis. At this point, the threat evaluation simulation 316 takes place. It calculates the probability distribution functions for the success of traversal, detectability, as well as any other parameters that might be assessed.

Once the results for an evaluation job are returned by the threat evaluation simulation 316, the threat evaluation engine 202 attempts to determine if the calculated risk is within a specified threshold. For certain networks, these thresholds may not be applied because they are not desired or the calculation time required to do a complete analysis is tractable. However in many networks, the amount of time required to evaluate a wide range of opponents against all of the operating stochastic processes is computationally difficult. As such, some embodiments, might limit the number of element service-access points through which a given piece of data sent by an opponent must pass. In others the threshold might limit further examination of paths that fall below a minimum risk threshold. Still other embodiments might limit the total time spent performing the evaluation. Ultimately, any number of thresholds could be applied either individually or together to limit further evaluation of threats. If any user specified thresholds are exceeded 318, the loop over all access point that can reach the target evaluated one network hop at a time 314 will be exited prematurely. At this point, each of the nested loops (320, 322, 324, 326, & 328) will be evaluated to determine if the loop exit conditions have been satisfied.

It is important to note that the ordering of the loops in the single-threaded approach is not important. For example, the loops over all opponents 306 and all of their gear configurations 308 could be embedded after the loop over every potential access point evaluated one network hop at a time 314. Having said that, certain specific loops should follow others. The set of opponent kits 308 should follow the opponent loop 306. Similarly, the loops over all services 310 should, for simplicity's sake, be followed by the loop over all access points that allow ingress to the target 312, and ultimately the evaluation of all possible access points with access to the target evaluated one network hop at a time 314.

Figure 4:
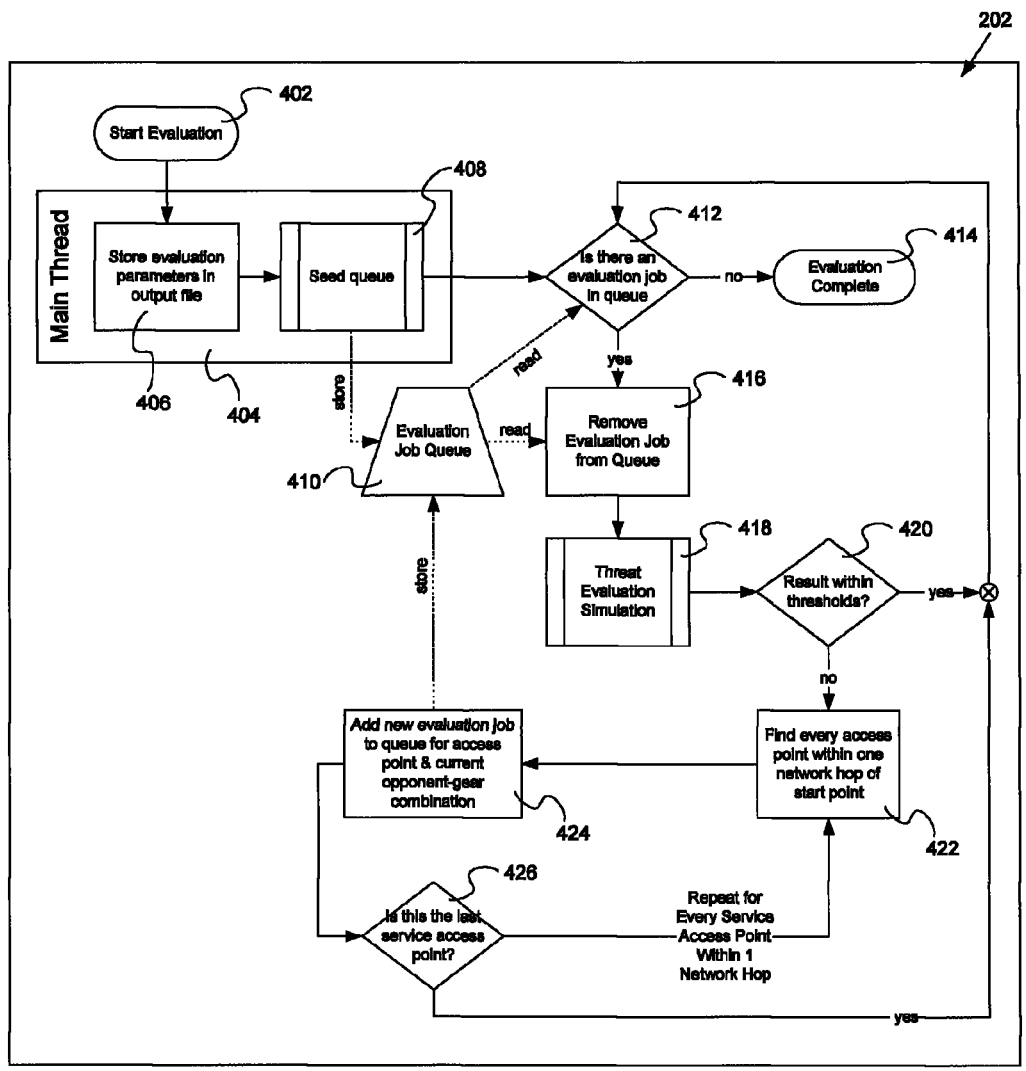
FIG. 4 is a flowchart providing detail about a parallel implementation of the threat evaluation engine portion of the threat evaluation system according to embodiments of the invention.

FIG. 4 displays a high-performance approach to the implementation of the threat evaluation engine 202. As in the single-threaded approach, the engine begins by storing the evaluation parameters specified by the user 406. However, the implementation diverges greatly from this point onward. It begins by seeding 408 an evaluation job queue 410 that contains a set of jobs for the opponents, their gear, services, and service-access points. Both of these processes should only be done by the main thread 404. Threads other than the main process would not perform these operations.

Once the evaluation job queue 410 has begun being seeded, any other threads operating can begin processing. First, processing threads determine if there are jobs remaining in the job queue 412. If so, the processing thread takes the job from the queue 416. In most implementations, these two steps would be atomic so as to avoid race conditions. The job is then fed to the threat evaluation simulation 418 for calculation. As with the single-threaded approach, no further action will be taken if the results are within any user specified thresholds 420.

However, if some combination of the possible thresholds has not been met, the engine will find every service access point that is within one network-hop of the one that was just evaluated 422. This set will not only include those access points that have immediate access to the current service, but also will include those that could connect if a vulnerability were exploited. For example, a firewall might limit access to a database server containing financial information to a small number of client systems. However, if an opponent were to take advantage of a vulnerability in the firewall implementation that allowed them to override the constraint on which systems could connect to the database, the server's access point becomes visible. A new job for the current opponent representation 140 and the path evaluated thus far plus the newly identified service-access point 424 will be added to the evaluation job queue 410 for each of the service-access points that are identified. Once there are no further service-access points for which new jobs must be created 426, the process will return to looking for the evaluation job in the queue 412.

Eventually, all of the jobs in the queue have been processed and the threat evaluation is complete 414. Going forward, we will only refer to the high-performance embodiment for the sake of brevity.

Seeding the Queue

Figure 5:
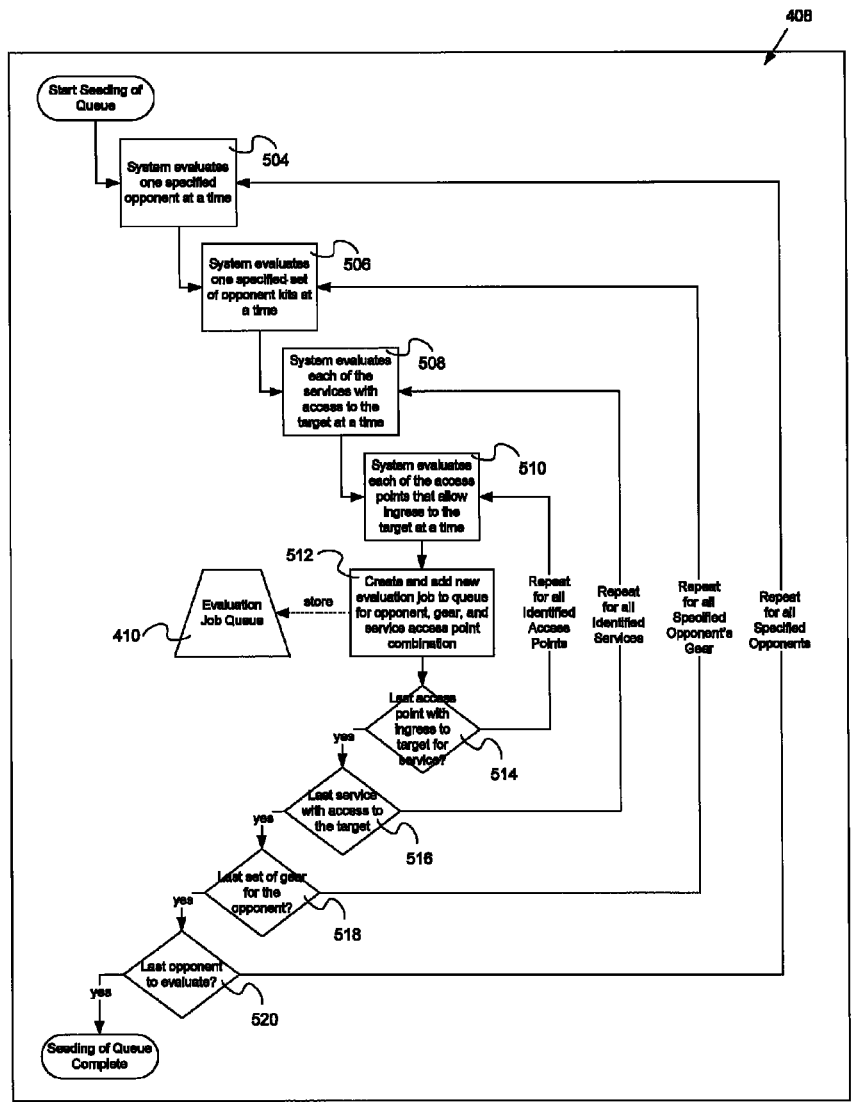
FIG. 5 is a flowchart providing detail about the queue seeding portion of the threat evaluation engine according to embodiments of the invention.

FIG. 5 shows the seeding queue 408 process used to initialize the threat evaluation engine with a set of evaluation jobs. This process, used in certain high performance embodiments, begins by individually evaluating each of the opponent instances 504 that were specified by the user. For each opponent, the seeding process then examines the potential opponent kits 506 which may contain user specified techniques 142, gear 144, materiel 146, and alternative possessions 148. In turn, the seeding process assesses each of the services with direct access to the target 508 for each of the opponent-kit pairs. Finally, each of the service-access points for each opponent, kit, and service triplet 510 are processed to create a new threat evaluation job 512. This job is stored in the evaluation job queue 410 to be processed by the threat evaluation engine. The seeding process then determines if each of the specified loops has met their termination conditions in the order that they were originally evaluated in 514, 516, 518, and 520.

The ordering of this evaluation is not important. As such, the evaluation of the services with access to the target 508 might occur first, followed by the evaluation of possible opponent gear 506 configurations, and ultimately by the set of desired opponents 504. However, the evaluation of each of the access points that provide ingress to the target at a time 510 should always come after the loop that evaluates each of the services 508. Similarly, the opponent's gear configuration 506 would more reasonably follow the selection of an opponent 504.

Threat Evaluation Simulation

Figure 6:
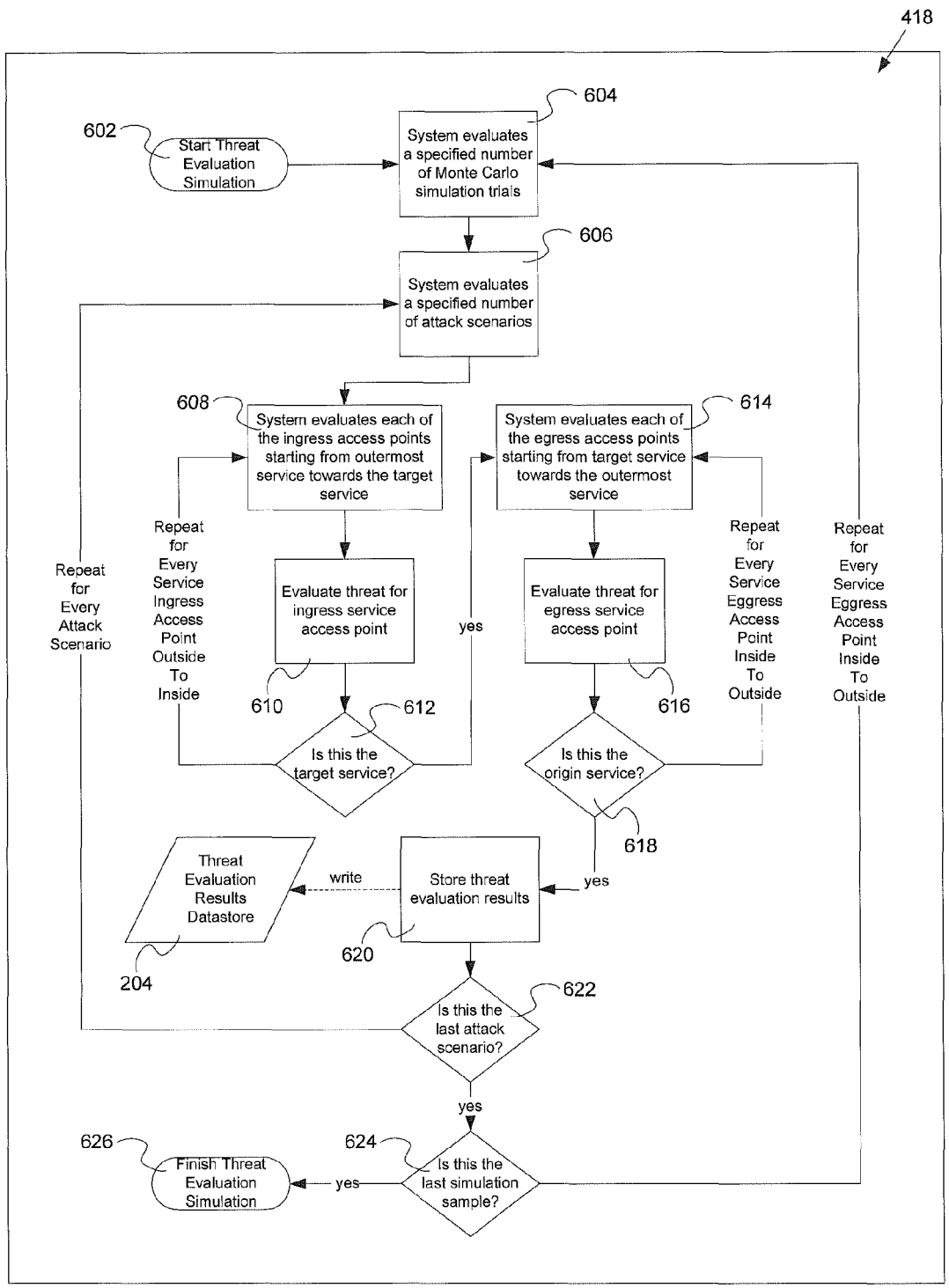
FIG. 6 is a flowchart providing detail about the threat simulation engine portion of the threat evaluation engine according to embodiments of the invention.

The threat evaluation simulation engine 418 shown in FIG. 6 uses Monte Carlo methods to evaluate a user-specified number of trials 604. Namely, the engine will sample the probability distributions to produce a representative set of all of the possible outcomes of the modeled system. The interplay between the individual probability distributions is quite complex. As such, the number of trials should be sufficiently large so as to guarantee that the random draws from each of the probability distributions that characterize the elements in the network are adequately sampled.

In cyber attacks, opponents typically put forth a significant number of connection attempts when trying to gain unauthorized access to a target. Consequently, the simulation engine will subsequently evaluate a user specified number of attack scenarios 606 representing these connection attempts.

In some embodiments, the simulation engine will not distinguish between ingress and egress paths through a service. Rather, the engine would evaluate transit through an access point only as the opponent approaches the target while no analysis would be performed on the return trip. In other embodiments such as that shown in FIG. 6, the engine will make this distinction so as to make the calculation of the detection of data that the opponent may have accessed on the target, amongst other key properties, more robust. Hereafter this discussion will focus on this particular embodiment. However this does not imply that the other approach could not be implemented.

Accordingly, the simulation engine begins evaluating each of the ingress access points 608 to the target for a given simulation trial 604 and attack scenario 606. The ingress evaluations 610 begin with the outermost location on the path and work towards the target. Each evaluation will make the random draws for the traversal, detection, response, and any other distributions required. It will then apply the results of these draws to determine how the simulation state has been changed. Any gear, materiel, or alternative possessions that the opponent may obtain from the access point is added to the opponent's kit. In some embodiments, only those items that may be useful for improving the opponent's chances of reaching the target will be added to their kit. In other embodiments, the opponent will randomly select which items to grab based upon a probability distribution describing the potential usefulness of the item in question. Still other embodiments might fork the evaluation into two or more pieces so that each individual possibility is treated as its own individual sample. The engine will continue to evaluate ingress access points until the target has been reached 612.

Thereafter, the simulation engine will begin evaluating each of the egress access points 614 reversing the inbound path taken to reach the target. Each egress threat evaluation 616 will make another set of random draws for the traversal, detection, response, as well as any other distributions required. It will then use the results of these draws to determine how the simulation state has been changed. Any gear, materiel, or alternative possessions that the opponent may obtain from the access point is added to the opponent's kit. The engine will continue to evaluate the egress access points until the origin of the attack is reached 618.

The results of the ingress and egress access point evaluations are then stored 620 into the datastore 204. If the last attack scenario for the particular Monte Carlo simulation is reached 622, then the engine begins the next simulation evaluation. If the last Monte Carlo simulation has been achieved 624, then the threat evaluation simulation for the given path and opponent is complete 626.

Analyst Reports

The results produced by the threat evaluation system 104 in FIG. 1 can be used to produce any number of analyst reports 102. A simple report might provide the worst, average, and best case scenarios for preventing unauthorized access to the set of targets in the modeled network. This simple report could be extended to include statistics about the calculated probability distributions. For example, an ellipse encircling approximately 68.27% of all results found in an area around the mean would define the first-standard deviation. Similarly, areas where approximately 95.45% and 99.73% of values would be used to define the second and third standard deviations. Conversely, if the results approximate a normal distribution the standard deviation could be calculated using well known formulae. In fact, any number of statistical evaluations well known to those skilled in the art could be performed on the results. This simple statistical report could be applied to specific targets, opponents, opponents with a particular set of starting gear, access points a given distance from the target, individual samples, as well as any combination of these or other groupings desired by the analyst.

In some embodiments of the system, a more sophisticated approach to estimating uncertainty in the simulation results may be used. Consider a resampling bootstrap statistical analysis where the user creates scenarios such that the element representations 160 in the network model datastore 112, the type of threats from the opponent catalog 110, and the characterizations in the cyber reference library 108 can be varied (see FIG. 1). These variations might involve random changes adhering to a set of boundary conditions. For example, the system might allow every draw from a probability distribution to vary by up to 25% so long as the values continue to fall between zero and one. This would introduce significant errors into the system. The variations could also be achieved by randomly selecting probability distributions from any location in the cyber reference library 108 and opponent catalog 110 and placing them into a given percentage of randomly selected elements used in the network model datastore 112. This approach is guaranteed to introduce some data points that do not correspond to what somebody skilled in the art would consider reasonable. Therefore this replacement should add significant uncertainty to the results. The uncertainty added through either of these approaches should avoid unreasonable optimism in estimating confidence intervals. The results of this analysis can be provided to the analyst using any of the variations of a statistical report described above. Of course, this approach is but one of many ways that bootstrap statistics might be gathered for statistical reports in the invention.

Figure 8:
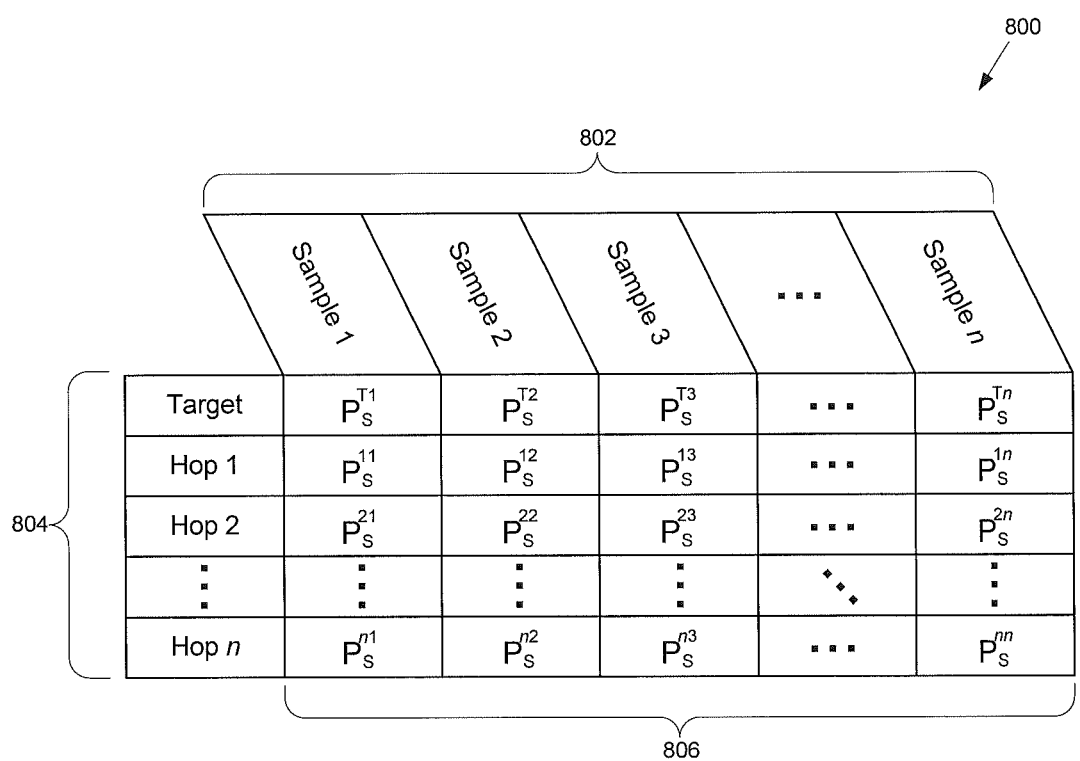
FIG. 8 is an illustration of an example report provided to analysts using certain embodiments of the invention.

A more complicated report, such as the example in FIG. 8, might include a table detailing the probabilities that a given opponent might successfully traverse an access point. This example shows individual samples in the columns 802 for a particular opponent attempting to reach a target while operating with their outfit. Because the simulation allows the opponent to acquire items, this outfit may contain assigned as well as obtained techniques, gear, materiel, and alternative possessions. This report rows 804 segregate results by the opponent's starting distance from the target as measured in network hops in the rows 804. Each entry in the table 806 contains the probability of traversal success, $P_S$. The superscript labels on each of the values first specify the row and then the column to which it is associated. This example report could be extended so that the values in 806 could be probabilities of detection, the probabilities that the system interceded to halt the attack automatically, or any other measures that an individual skilled in the art might build into the simulation engine.

Similarly, both the columns and/or the rows of the report could be varied. For instance, the columns 802 could contain a list of opponents with their associated outfits while the rows 804 might contain distance. The values in the table would likely be displayed for a specific sample. Another variation might still have the opponents in columns 802 while the rows 804 would display individual attack scenarios. Again, the values in the table would likely be for a specific sample. Again, there is no limit to the choices that an analyst has with respect to the columns and rows for reports of this type.

The system might also provide information in reports that are more graphical in nature. Instead of displaying the values in a table format, items could be grouped by color. For example, a graph displaying $P_S$ along the y-axis and sample number along the x-axis could be grouped by color depending on the opponent representation for those samples. Conversely, the color grouping might be performed on distance from target, the target itself, probability of detection, or any other measure that has been or could be calculated from the results. Likewise, the x and y-axis parameters could be chosen from a wide variety of possible data aggregations.

In some embodiments, an analysis of the impact caused by changing certain features in the network model datastore 112 can be performed (see FIG. 1). A "what-if" analysis, as it is often called, could answer the question of how scenarios implemented as deviations from a baseline network-model might affect security. A report for this analysis could display the areas in the model that have shown significant improvement or degradation in the ability of an opponent to reach the target. In particular, this report could show the changes to traversal success for an opponent sorted from greatest improvement to greatest degradation. The report might also display the changes in probability of successful traversal graphically so that the analyst could quickly determine the impact of the network changes. A further enhancement to this embodiment could allow for the collection of costs associated with a set of changes to the network. Thus, cost-benefit reports could be generated for the associated changes. Yet another enhancement could allow for the collection of probabilities for a given type of attack from the opponent catalog 110 against a target as well as the consequence of the loss of the asset. This would allow for the calculation of the classic risk characterization for the network.

In other embodiments, the cyber reference library 108 contains a set of best practices. Accordingly, a simulation can be run where every entry in the network that does not meet or exceed the established best practices will be replaced with one that does. The results of this simulation can then be compared against those generated from the original network model in the same fashion as the what-if analysis.

In still other embodiments, the cyber reference library 108 contains a historical change to the service characterizations 120 that represent how the threats to a network have evolved. For instance, a buffer-overflow vulnerability might be discovered in a web server from one week to the next. The library might contain several distinct distributions for this web server based upon policies (e.g. required patching frequency) as well as administrator skill (i.e., how well we can guarantee that the patch was applied properly). Each of these, and any other groups of probability distribution that an individual skilled in the art might choose to create in the reference library would change over time. Similarly, opponent representations 140 in the opponent catalog 110 may also contain historical changes. For example, a particular opponent representation might be granted a new set of techniques 142 to reflect how a particular threat has become more adept at particular styles of vulnerability exploitation. The cyber reference library or opponent catalog created for a particular operational state is often called the threatscape. An analyst could use changes in the so-called threatscape to identify how their security profile performs over time. Moreover, an analyst could use the result of the threat evaluation to highlight areas of the network where it has become more likely that an opponent will succeed. The administrators of the network could then focus on defending and correcting any issues that an opponent might take advantage. which have the highest likelihood of unauthorized access Clearly, there is no limit to the types of information that might be displayed in reports using the results from the threat evaluation system. The invention is not limited to a restricted set of reports. In fact, some embodiments might provide the user with an application programming interface that would allow the creation of custom reports without having to have intimate knowledge of the methods used to store the data.

Computer System

Figure 24:
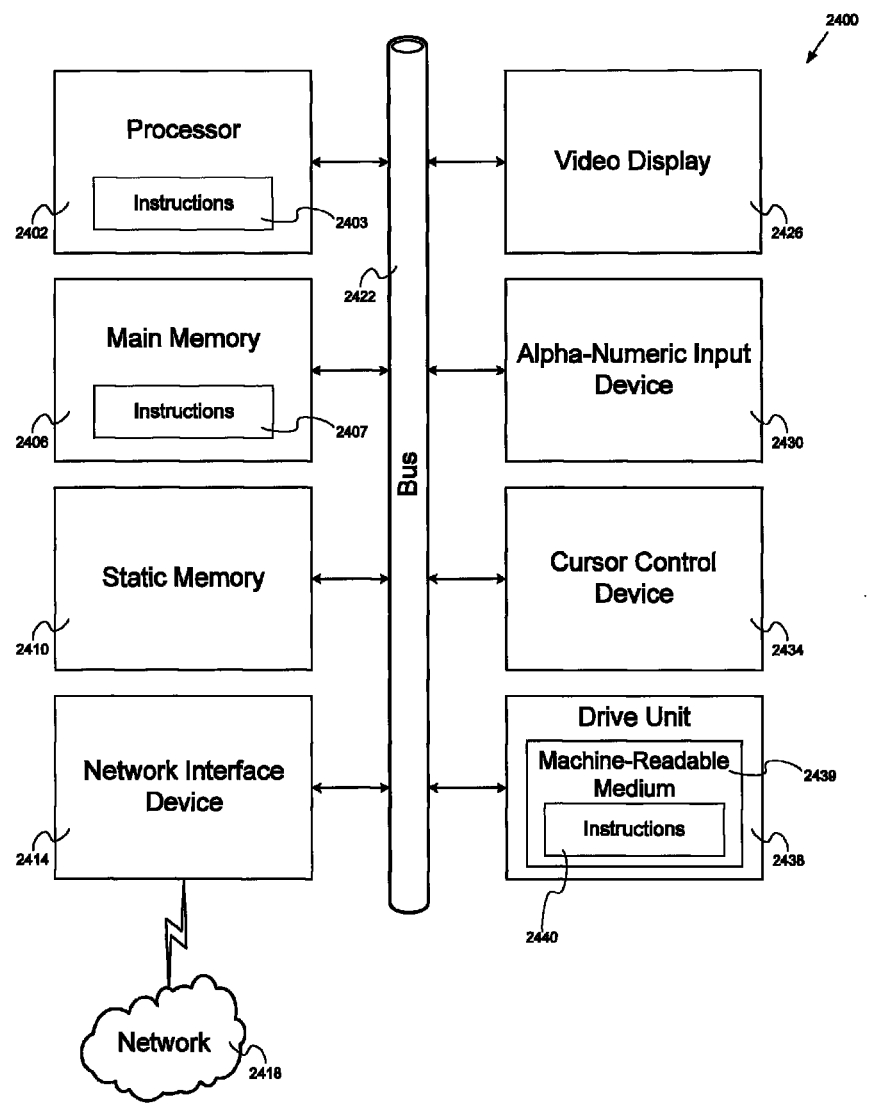
FIG. 24 is a block diagram of an example embodiment of a computer system.

FIG. 24 is a block diagram of an example embodiment of a computer system 2400 upon which embodiments inventive subject matter can execute. The description of FIG. 24 is intended to provide a brief, general description of suitable computer hardware and a suitable computing environment in conjunction with which the invention may be implemented. In some embodiments, the invention is described in the general context of computer-executable instructions, such as program modules, being executed by a computer. Generally, program modules include routines, programs, objects, components, data structures, etc., that perform particular tasks or implement particular abstract data types.

As noted above, the system as disclosed herein can be spread across many physical hosts. Therefore, many systems and sub-systems of FIG. 24 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 24, a hardware and operating environment is provided that is applicable to both servers and/or remote clients.

With reference to FIG. 24, an example embodiment extends to a machine in the example form of a computer system 2400 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 2400 may include a processor 2402 (e.g., a central processing unit (CPU), a graphics processing unit (GPU) or both), a main memory 2406 and a static memory 2410, which communicate with each other via a bus 308. The computer system 2400 may further include a video display unit 2426 (e.g., a liquid crystal display (LCD) or a cathode ray tube (CRT)). In example embodiments, the computer system 2400 also includes one or more of an alpha-numeric input device 2430 (e.g., a keyboard), a user interface (UI) navigation device or cursor control device 2434 (e.g., a mouse), a disk drive unit 2438, a signal generation device 318 (e.g., a speaker), and a network interface device 2414.

The disk drive unit 2438 includes a machine-readable medium 2439 on which is stored one or more sets of instructions 2440 and data structures (e.g., software instructions) embodying or used by any one or more of the methodologies or functions described herein. The instructions 2440 may also reside, completely or at least partially, within the main memory 2407 or within the processor 2403 during execution thereof by the computer system 2400, the main memory 2406 and the processor 2402 also constituting machine-readable media.

While the machine-readable medium 2439 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media that can store information in a non-transitory manner, i.e., media that is able to store information for a period of time, however brief. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 2440 may further be transmitted or received over a communications network 2418 using a transmission medium via the network interface device 2414 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, wireless data networks (e.g., WiFi and WiMax networks), as well as any proprietary electronic communications systems that might be used. The term "transmission medium" shall be taken to include any intangible medium that is capable of storing, encoding, or carrying instructions for execution by the machine, and includes digital or analog communications signals or other intangible medium to facilitate communication of such software.

Manual Calculations

Characterizing the ability for a set of opponents to traverse all of these combinations quantitatively is a daunting task for an analyst to undertake. In order to properly characterize the probability of unauthorized access to a network, a number of network hops from the target might need to be analyzed. Moreover, each type of service may contain a number of service-access points that each allow for proper usage, misconfiguration, or vulnerability type entry. What is more, these entry points could easily involve a number of multiple-stage or multi-component traversals in order to reach a target. The number of possible combinations of paths coming into a target including all of these facets grows geometrically.

Yet this process is complicated further by a number of factors. Opponents can pick up items during an intrusion that improve their ability to reach a target. Analysts must evaluate a wide range of opponents to properly describe the threats a network might face. Each attack undertaken by an opponent might involve thousands of individual attacks. Finally, the analyst must choose an evaluation method that accommodates the inherent uncertainty in cyber networks. Namely, network elements come and go particularly in this age of mobile devices and virtual machines, services change state regularly (e.g. crash), data moves across networks, policies and procedures change, system configurations change, and there is also the constant chance of a zero-day vulnerability arising just to name a few of the sources of ambiguity.

Add any what-if, best-practice, or any other type of custom scenario calculations to this mix of complicated network paths and uncertainty, it becomes clear that performing a proper quantitative analysis is effectively impossible for an analyst without the system described here. The examples included herein will further elucidate this fact.

EXAMPLES

A series of examples illustrating the operation of the above-described systems and methods will now be provided. It should be noted that the embodiments are not limited to the modes of operation described below and that other modes of operation besides those detailed in the examples below are possible and within the scope of the inventive subject matter.

Example 1

Figure 9:
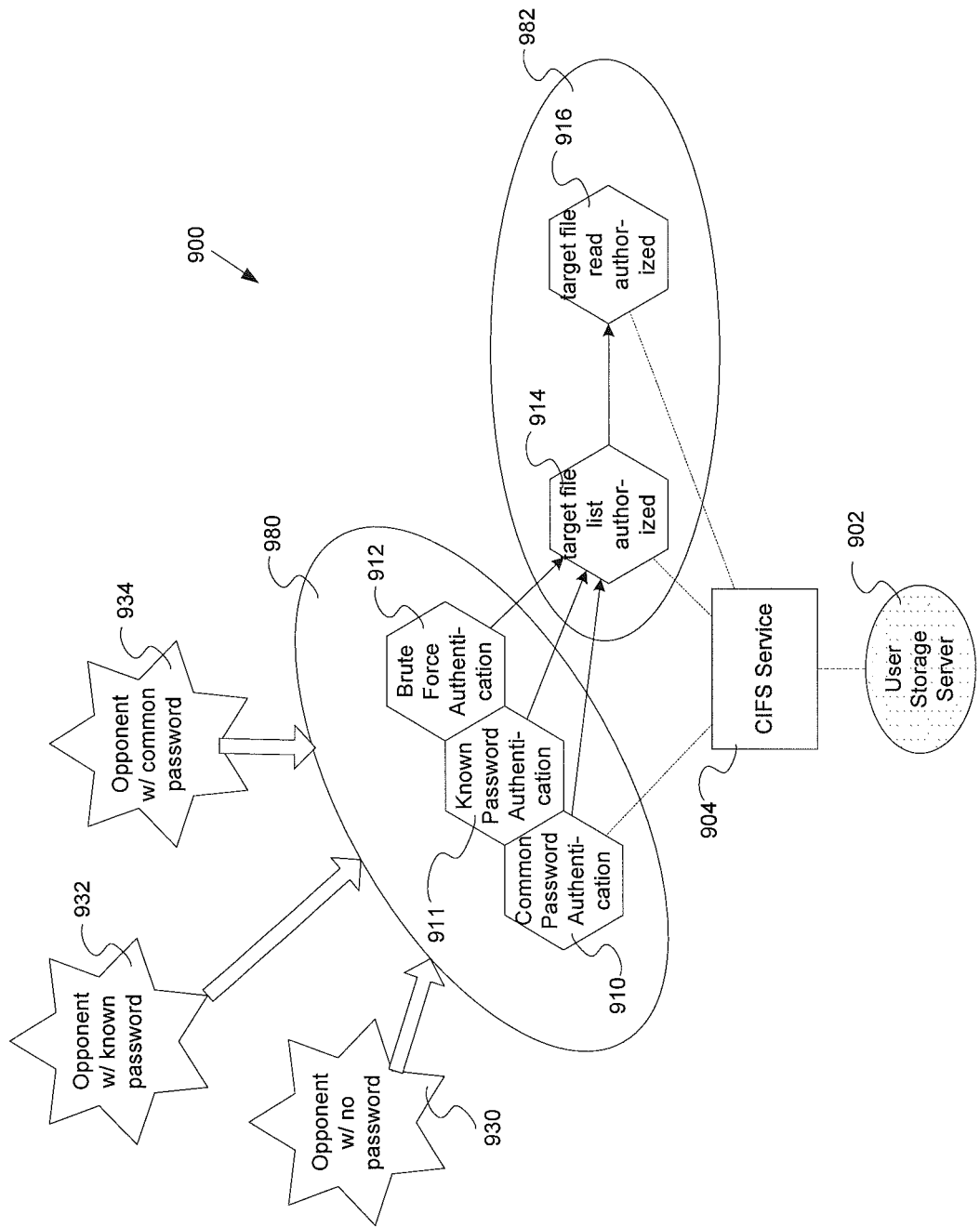
FIG. 9 is a simple example model of a shared drive server containing target data. This type of service is familiar to a large portion of the business-user community.

The example in FIG. 9 displays a model where a target is located on user storage server 902. This target might be some intellectual property, personally identifiable information, revenue forecasts, or any other information that is proprietary or restricted by a company. The target data is exposed through a common internet file system (CIFS) service 904 that provides shared access to files (this service is also commonly known as server message block (SMB)). Typically, a computer providing services such as this might use a centralized user authentication and authorization system such as Microsoft's Active Directory or LDAP. It might also allow for remote access services such as Microsoft's Remote Desktop Connection or OpenSSH so that administrators might more easily manage the machine. However, in an effort to keep this example simple we will assume that there are no other services operating on the storage server 902 at this time.

In this simple example, the cyber reference library contains one multi-component path that would allow an opponent to gain access to the target. This path consists of an authentication phase 980 followed by an authorization phase 982. Incidentally, both 980 and 982 are aggregation constructs used for illustrative purposes. The cyber reference library is not required to group items in this fashion. This simple example will only use the most basic of probability distribution functions: a constant value. This is not to imply that the cyber reference library is limited to this type of distribution. Rather, the library might contain a mix of distributions including but not limited to constant, triangular, normal, weibull, or enumerated-value.

The authentication phase 980 provides three parallel access points to an opponent. The common-password authentication 910 access point assumes that that the opponent has obtained a password for some user that is not applicable to the current security domain (e.g. sikernes.com). The opponent believes that the user whose password has been obtained is also a user on the protected network. Because users often use similar, if not the same passwords across domains, this knowledge significantly improves the probability that the opponent will successfully traverse this access point. All the opponent must do is to guess the user's login name and password using the information they have obtained elsewhere such as from a personal email account. The probability that this is possible is related to the policies that the protected network has for its user accounts. Companies typically assign login names as some derivative of the user's name so this is quite easy to predict. However, the policy regarding the complexity of the password will dictate whether the probability that the password for a personal account is similar to their place of work. Most users prefer shorter passwords so a company whose policy requires sixteen-character passwords with a mix of case, numbers, and punctuation marks is less likely to have this issue than one requiring eight characters with a mix of characters and numbers. Furthermore, an institution that requires that passwords be changed more often might cause users to add simple prefixes or suffixes to their passwords unless the policy prohibits similar passwords between changes. Further, many systems will lock a user out after a series of unsuccessful login attempts within a set period of time. Depending on the frequency that the opponent attempts to access the user account, the opponent could be locked out of the system effectively making their common password useless. It is also possible that the network has an intrusion detection system that is capable of determining if an attempt to guess a particular user's password is underway. If triggered, this system would alert administrators who could then take defensive actions. Because our example is intended to be basic, we will simply assume a simple probability that an opponent with a common password has a 5% probability of traversal for this example. We will also assume that the opponent is patient and is making attempts to guess the user name and password below the threshold that would trigger an automatic response. Lastly, we will assume that there is no intrusion detection system.

The second authentication-phase 980 access point 911 assumes that the opponent has obtained both the user name and password for a given user on the network. In this situation, the opponent has a nearly 100% probability of traversal. However, there is a slim chance that the password has expired before the opponent can use it. Thus, we will adjust the probability down to 98%. There is another small chance that the network has a detection system that is capable of noticing if a user is using the system at unexpected times. We will assume that such a system does not exist in our example.

The third authentication-phase 980 access point 912 assumes that the opponent has no a priori information about a user name or password; instead they must brute-force guess the authentication information. The probability of guessing both a user name and password in this situation relies entirely on company policies. For instance, if a company allows short or easy to guess passwords such as those consisting of dictionary words, then the probability of traversal will be relatively high. However, policies requiring strong passwords will significantly reduce this likelihood. An opponent cannot tractably guess a password while remaining under the threshold for automatic account lockouts. A clever opponent might vary the login name rapidly rather than the password but this will likely increase the amount of time this approach will take. Even given this, the amount of time this approach could take significantly increases the likelihood that an administrator will notice this attack even if there are no automated systems present to help them. For this example, we will assume that the probability of traversal is 0.05% and that each pass through all of the login name combinations in the opponents takes 10 hours. Reducing the size of the opponent list would further decrease the probability of traversal because there would be an even smaller likelihood that the opponent would successfully guess a login name Clearly, any appreciable chance of an opponent getting in through this approach would take a remarkably long time. Consequently, this approach is not favored by sophisticated intruders. As such we will not go through the additional effort of describing detection in this particular example despite the fact that it is almost guaranteed for all but the least observant administrators.

The first authorization-phase 982 access point 914 limits the number of authenticated users who can see the target information on the CIFS service 904. Because most companies restrict key data to a subset of users, the probability of traversal for this access point is simply the percentage of users who can see those files. For this example, we will assume 10%. Nonetheless, it is common for a group of users to be able to see a folder containing sensitive data but only have access to certain items in that folder. The second authorization-phase access point 916 is the probability that a user able to see a file will also be able to read it. We will assume that 50% of the users who have access to the folder will also have authorization to read the target data.

The opponent catalog for this example will consist of three opponents. The first is an opponent with no gear available 930. The second is an opponent who has a known password 932. This password could have been obtained, to name a few means, through a key-logger installed on a machine, by convincing the user through spurious means to provide it, by careless password controls, or via the opponent being an insider who has a valid account. The third opponent has a common password 934 obtained from another security domain. The possible sources for this password are too numerous to describe.

The threat evaluation can now begin. We will assume that the user has specified that 100 samples each with 1,000 attack attempts will be simulated. The first step would be to make any simulation-wide random draws necessary to create opponent instances 222 and the simulation model 224 as seen in FIG. 2. Next, we would store the initialization parameters in the output file and seed the queue with jobs for all access points capable of reaching the target. Seeding the queue in this simple example would create all of the jobs necessary for the evaluation. A total of nine jobs, three for each opponent taking each of the parallel choices for the single multi-component path, would be created.

TABLE 1

Approximate probability of successful traversal assuming a sufficient number of samples for convergence. See FIG. 9 for the reference numbers.

| Path | Opponent with no Password 930 | Opponent with known Password 932 | Opponent with Common Password 934 |
|---|---|---|---|
| common-password authentication 910 → target file list authorized 914 → target-file read authorized 916 | 0% | 0% | 5% × 10% × 50% = 0.25% |
| known-password authentication 911 → target file list authorized 914 → target-file read authorized 916 | 0% | 98% × 10% × 50% = 4.9% | 0% |
| brute-force authentication 912 → target file list authorized 914 → target-file read authorized 916 | 0.05% × 10% × 50% = 0.0025% | 0.05% × 10% × 50% = 0.0025% | 0.05% × 10% × 50% = 0.0025% |

The threat simulation engine shown in FIG. 6 would then evaluate the 1,000 attack attempts 606 for each of the 100 simulation trials 604 for each opponent. The simulation engine would then make random draws that apply to all of the attack attempts for which there are none in this example because the distributions are constant. Next, then engine would make random draws to see which of the 1,000 attack attempts are successful. Similar draws would be taken for detection and automated-response measures. The multi-component attack consists entirely of ingress access points so the simulation will only consider ingress access points 608, 610, and 612.

The approximate traversal probabilities for this example are shown in Table 1. The values assume that there are sufficient samples to converge. However, it is possible that "lucky" draws occurred that might skew the results slightly in either direction. These results do not take into account the significant amount of time the brute-force method would take. Nor do they take into account any detection events that might complicate this simple example. Finally, they do not assign a probability that any of the opponents considered might attack this network. The analyst using these results must take these facts into consideration when presenting the results.

Some of the values in Table 1 represent paths that an actual attack might not consider. For instance, it is quite unlikely that the opponent with known password 932 in the second column would attempt a brute force approach in the third row. However, the threat evaluation system is intended to be thorough and therefore considers items that an expert might ignore. In particular, the system has no idea what the probability that an opponent with a known password might exist. Even if an opponent with that gear were to exist, the system has not made a judgment of how likely the opponent can reach the targeted authentication system; in effect, having user credentials might be useless if they have no network or physical access to the authentication system. Further, the authentication token that the opponent has, while proper, may not have the necessary authorization rights to access the targeted data. If certain paths prove to be less productive, the reporting system might provide a means for filtering these low probability entry points. Of course, certain embodiments that enforce thresholds might limit any further expansion of a path that has a low likelihood of providing unauthorized access to a target. Similarly, embodiments could be created that only consider the path where they are more likely to succeed.

Example 2

Figure 10:
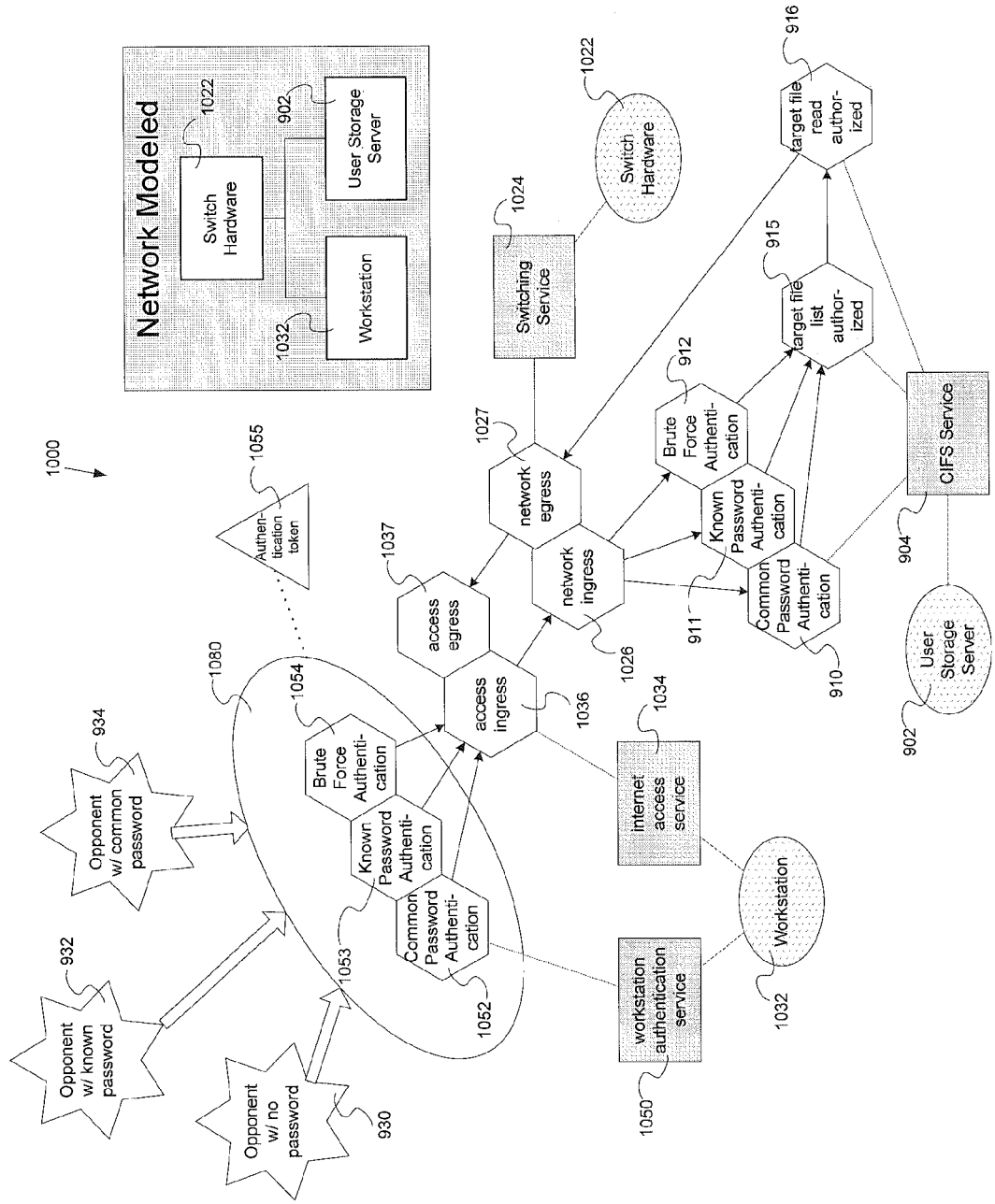
FIG. 10 is a somewhat more complicated version of the example model shown in FIG. 9 that includes transit from a user's workstation.

Example 2 shown in FIG. 10, extends upon the previous example by adding a workstation 1032 connected to a network switch 1024 that then provides access to the CIFS service 904 (refer to the inset for the network configuration). In this somewhat more complicated example, the network model contains several new paths connecting the user storage server 904 to a network switch 1022 and then onto a workstation 1032. The cyber reference library 108 will contain several additional services to accommodate these changes.

First, the switching service must allow networked access to the CIFS service 904. This is accomplished by adding a switching service 1024 which contains a single ingress access point 1026 connecting to each of the three authentication access points on the CIFS service 904. It also contains a single egress 1027 access point that is connected from the target-file read access point 916. We will assume that this switch does not restrict network traffic and is not capable of detecting sensitive data such as social security numbers. Consequently, the probability of traversal for both of these access points is 100%.

Next, there is an internet-access service 1034 on the workstation that allows users to connect to services. This service has a single 1036 ingress and single egress 1037 access point connecting to the switching service ingress 1026 and egress 1027 respectively. The workstation allows all incoming and outgoing established network access requests. Thus, the traversal for both of the internet-access services' 1034 access points will have traversal probabilities of 100%.

Finally, the workstation also has an authentication service 1050 which allows users to use the workstation. For simplicity's sake, we will assume that the authentication and authorization domain is the same as that used by the CIFS service 904. Accordingly, we will use the same probabilities as the authentication for the CIFS service 904 described in the previous section: 5% for common-password authentication 1052, 98% for known-password authentication 1053, and 0.05% for the brute-force authentication 1054. Having said that, once an opponent has traversed any of the authentication access points for the workstation authentication service 1080 they will obtain an authentication token 1055. This known password gear can subsequently be used in the known-password authentication for the CIFS service 911.

These jobs will be evaluated by the simulation engine as described in the previous example with several key differences. The queue seeding 408 performed by the evaluation engine shown in FIG. 4 will start with nine jobs, as before. Further, we will assume that there are no user-specified result thresholds to be used to exclude the creation of largely redundant jobs. For instance, the likelihood of traversing the CIFS service 904 is sufficiently low enough that a user might not care to evaluate any access points connecting to it further. Another difference is that after each job completes, the threat-evaluation engine will seek to find every access point within one network hop of the start point 422. For instance, if the path evaluated contains access ingress 1036→network ingress 1026→common password authentication 910→target file list authorized 914→target file read authorized 916→network egress 1027→access egress 1037, it will locate three additional access points for which jobs should be created 424: common-password authentication 1052, known-password authentication 1053, and brute-force authentication 1054. Any jobs located will be added to the evaluation queue 424.

TABLE 2

Approximate probability of successful traversal assuming a sufficient number of samples for convergence. See FIGS. 9-10 for the reference numbers.

| Path | Opponent with no Password 930 | Opponent with Known Password 932 | Opponent with Common Password 934 |
|---|---|---|---|
| common-password authentication 1052 → access ingress 1036 → common-password authentication 910 → target file list authorized 914 → target file read authorized 916 → network egress 1027 → access egress 1037 | 0% | 0% | 5% × 100% × 100% × 5% × 10% × 50% × 100% × 100% = 0.0125% |
| common-password authentication 1052 → access ingress 1036 → known-password authentication 911 → target file list authorized 914 → target file read authorized 916 → network egress 1027 → access egress 1037 | 0% | 98% × 100% × 100% × 98% × 10% × 50% × 100% × 100% = 0.245% | 0% |
| common-password authentication 1052 → access ingress 1036 → brute-force authentication | 5% × 100% × 100% × 0.05% × 10% × 50% × 100% × 100% = 0.000125% | 5% × 100% × 100% × 0.05% × 10% × 50% × 100% × 100% = 0.000125% | 5% × 100% × 100% × 0.05% × 10% × 50% × 100% × 100% = 0.000125% |

TABLE 2-continued

Approximate probability of successful traversal assuming a sufficient number of samples for convergence. See FIGS. 9-10 for the reference numbers.

| Path | Opponent with no Password 930 | Opponent with Known Password 932 | Opponent with Common Password 934 |
|---|---|---|---|
| 912 → target file list authorized 914 → target file read authorized 916 → network egress 1027 → access egress 1037 | | | |
| known-password authentication 1053 → access ingress 1036 → common-password authentication 910 → target file list authorized 914 → target file read authorized 916 → network egress 1027 → access egress 1037 | 0% | 0% | 98% × 100% × 100% × 5% × 10% × 50% × 100% × 100% = 0.245% |
| known-password authentication 1053 → access ingress 1036 → known-password authentication 911 → target file list authorized 914 → target file read authorized 916 → network egress 1027 → access egress 1037 | 0% | 98% × 100% × 100% × 98% × 10% × 50% × 100% × 100% = 4.82% | 0% |
| known-password authentication 1053 → access ingress 1036 → brute-force authentication 912 → target file list authorized 914 → target file read authorized 916 → network egress 1027 → access egress 1037 | 98% × 100% × 100% × 0.05% × 10% × 50% × 100% × 100% = 0.00245% | 98% × 100% × 100% × 0.05% × 10% × 50% × 100% × 100% = 0.00245% | 98% × 100% × 100% × 0.05% × 10% × 50% × 100% × 100% = 0.00245% |
| brute-force authentication 1054 → access ingress 1036 → common-password authentication 910 → target file list authorized 914 → target file read authorized 916 → network egress 1027 → access egress 1037 | 0% | 0% | 0.05% × 100% × 100% × 5% × 10% × 50% × 100% × 100% = 0.000125% |
| brute-force authentication 1054 → access ingress 1036 → known-password authentication 911 → target file list authorized 914 → target file read authorized 916 → network egress 1027 → access egress 1037 | 0% | 0.05% × 100% × 100% × 98% × 10% × 50% × 100% × 100% = 0.00245% | 0% |
| brute-force authentication 1054 → access ingress 1036 → brute-force authentication 912 → target file list authorized 914 → target file read authorized 916 → network egress 1027 → access egress 1037 | 0.05% × 100% × 100% × 0.05% × 10% × 50% × 100% × 100% = 0.000001% | 0.05% × 100% × 100% × 0.05% × 10% × 50% × 100% × 100% = 0.000001% | 0.05% × 100% × 100% × 0.05% × 10% × 50% × 100% × 100% = 0.000001% |

When complete, a total of 54 jobs will be evaluated for this example: 9 starting at the target CIFS service 904, 9 starting from the switching service 1024, 9 starting from the internet-access service 1034, and 27 for the workstation authentication service 1080. The distance from the target for these jobs ranges from zero to three network hops. Because the probability of traversal for the switching service 1024 and internet-access service 1034 is 100%, the approximate traversal probabilities remain the same as those shown in Table 1.

The approximate values for the 27 jobs a distance of 3 hops away are shown in Table 2. Because there was no threshold used to limit the creation of jobs in this example, many of these jobs produced results that were extremely unlikely (e.g. 12.5 times out of a billion) The values assume that there are sufficient samples to converge. Yet there remains a possibility that "lucky" draws might have occurred that would skew the results slightly in either direction. An analyst will perform the a sufficient number of runs to get an acceptable set of results. In particular, statistical techniques known to one of ordinary skill in the art can mediate any convergence issues.

These results do not take into account the significant amount of elapsed time that the brute-force method would take. Nor do they take into account any detection events that might complicate this simple example. Finally, they do not assign a probability that any of the opponents considered might attack this network. The analyst using these results must take these facts into consideration when presenting the results.

The process used to define different threat models as described in FIG. 1, items 110, 108, and 112 will continue to be explored in the ensuing examples in an effort to further elucidate the capabilities of the invention. In particular, these examples will describe a set of simple communications network configurations whose variations might be commonly seen by an analyst skilled in the art. However, the computation process described in FIGS. 2, 3, 4, 5, 6, and 8 is consistently applied irrespective of the underlying model. Describing it further is remarkably difficult and tedious and is the reason why manual approaches are insufficient to the task. Thus, automating this process, as described in the present work, are necessary. Indeed, performing a quantitative an analysis of the security posture of the subsequent example network models is effectively impossible for an analyst to perform without the invention described herein.

Example 3

This example entails a phishing attack aimed at installing malicious software onto an inside user's workstation. This example is unusual in that that it is indirect as it requires a naïve (or nefarious) action by an inside user to accomplish the attack. Further, the attack requires the user to access external services hosting malware. To elaborate, phishing involves an attempt to subvert users to perform an activity by masquerading as a trustworthy actor in an electronic communication such as an email. This type of subversive activities includes, but is not limited to, providing data or installing malicious software onto their machines. This example, unlike the previous two, will not assign example values to the probability distributions because the calculation of any results is too difficult to briefly describe even with simplified assumptions.

Figure 11:
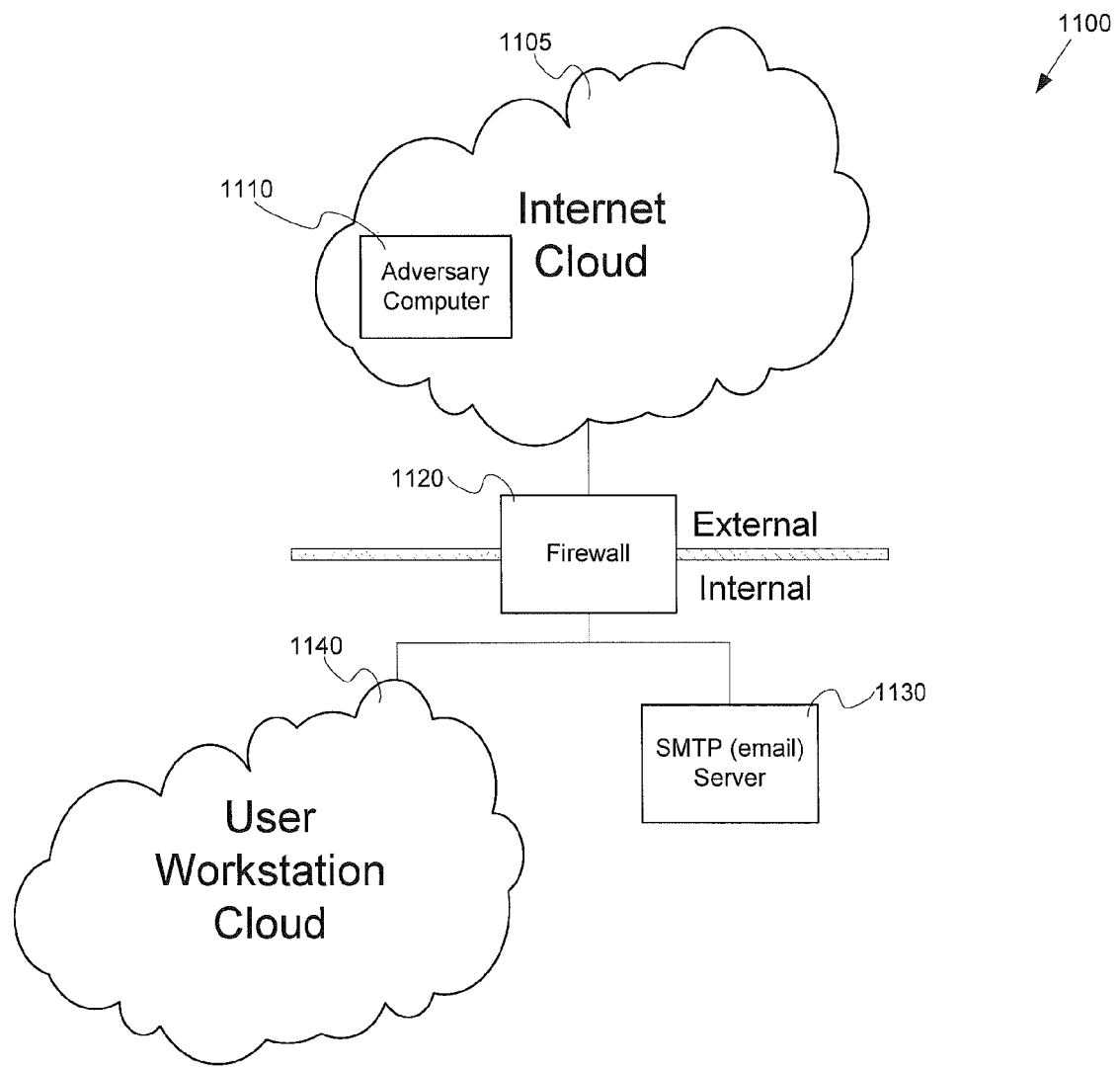
FIG. 11 illustrates an example network used to model a phishing attack against a firewall protected network containing an email service and a number of user workstations.
Figure 12:
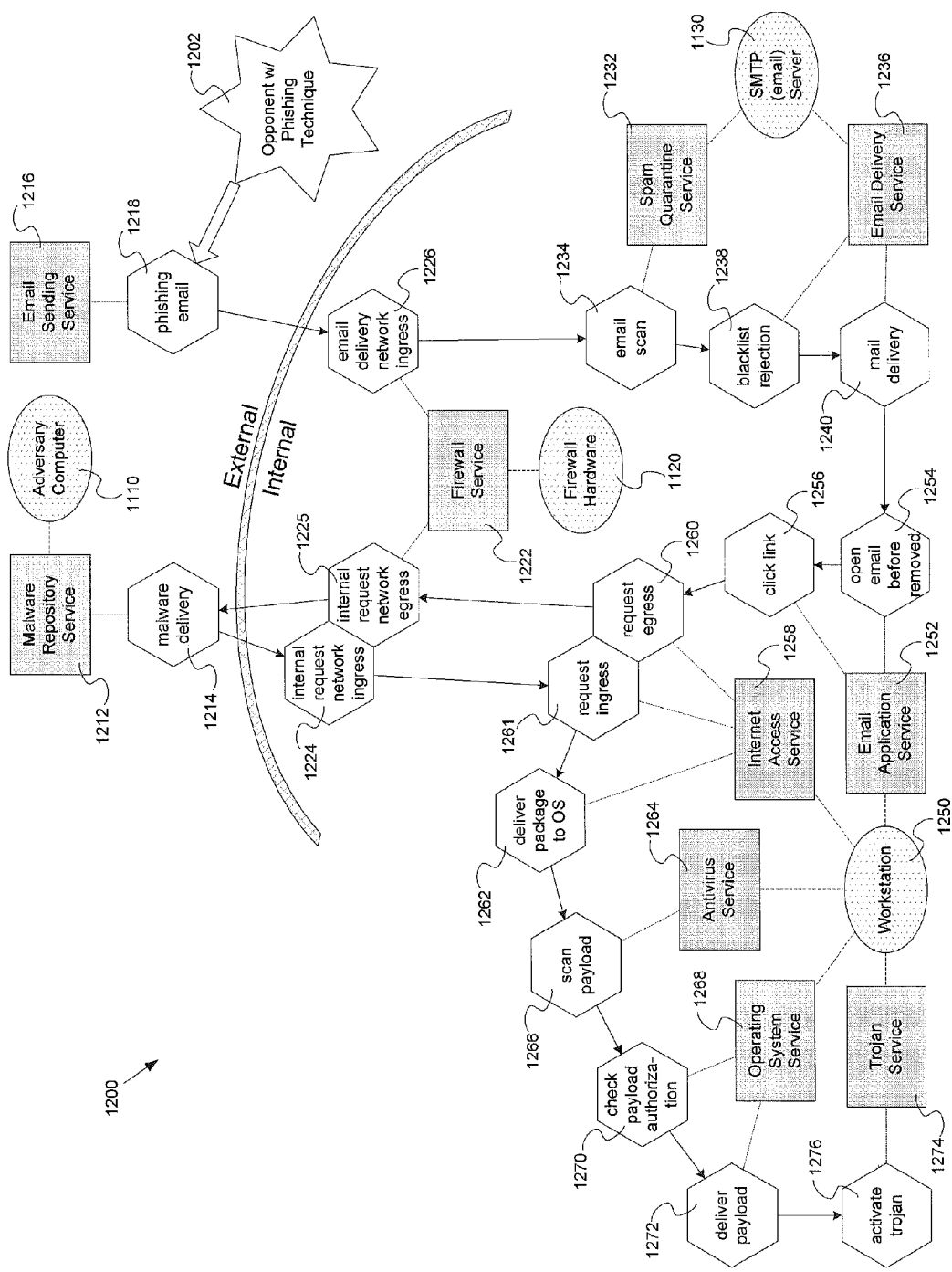
FIG. 12 is an example model of a phishing attack against a user workstation using email as the trusted communication medium. This example is unusual in that it models an attack that requires the interaction of an unsuspecting user.

FIG. 11 displays a simple example network where a phishing attack might be executed. This network contains a firewall 1120 connected to the Internet on the external side, an email server 1130, and a group of user workstations 1140 on the internal side. In this model, each of the workstations is a potential target. Clearly, an analyst seeking to model this type of attack will need to add a fictional adversary computer 1110 in addition to the elements known to exist in the network. FIG. 12 displays an example model of a phishing attack on this example network. In particular, this model involves a user's click on a link to a malicious website that seeks to download and install malicious software.

This model requires minimal changes to the opponent catalog 110. In particular, we would create an opponent with a phishing technique 1202. However, a significant number of additions are required to the cyber reference library 108 to support all of the new services in the model. The opponent attack begins using the email sending service 1216 located on the adversary computer 1110. This service is used to send the trusted communication to the target users. Each of the messages first must pass through the email delivery network ingress 1226 access point on the firewall service 1222. This ingress point has a probability distribution describing the likelihood that the domain from which the trusted communication is allowed to send messages. If the message successfully passes through the firewall, it is then delivered to a multi-component path containing three access points across two services on the email server 1130.

The first access point in the multi-component path is the email scan 1234 of the spam quarantine service 1232. This access point contains a probability distribution describing the chance that the message will be flagged as spam. If the message is not tagged as spam, it is then delivered to the blacklist rejection 1238 access point on the email delivery service 1236. This access point has probability distributions describing the likelihood that the sender or the sender's domain has been blacklisted by email server 1130. The particular probability distribution that will be used by the threat-evaluation system depends on the alert level. In particular, elevated alerts will result in lower probabilities that the message will be allowed to pass. The alert could be raised during a detection event. That said, for simplicity, this example does not contain any detection systems. Next, the message must be delivered 1240 to an actual user. This access point contains a distribution describing the likelihood that the user to which the message is addressed exists and has space in their inbox.

The remainder of this attack relies on a user on one of the workstations 1250 opening and interacting with the contents of the message. The user must open the message using an email application service 1252 before the email is removed 1254 by an administrator. The access point also has multiple probability distributions dependent upon alert level. If no evidence of a phishing attack exists, there is zero chance that an administrator would intercede. However, once a phishing attack has been identified, the probability that the message will be removed approaches 100%. The example also assumes the user is interested in the information contained in the message. There is a probability distribution describing the likelihood that the user clicks the link 1256. If this occurs, the request is forwarded to the internet-access service 1258 to egress 1260 out to the internet. There is some probability that the request is denied because the application used to access the internet may in fact be blocking the site containing the malware to be delivered. If the request is allowed, it must go through the firewall service's 1222 internet-access egress 1225. This access point also has a probability that the service is blocking access to the site containing the malware. If the request is passed to the internet, it must be handled by the malware repository service 1212. The malware delivery 1214 access point contains a probability distribution that no malware specific to your system is available or that the service has been shut-down by an upstream provider. Once the malware delivery sends its response, the internal request network ingress 1224 contains a set of probability distributions describing if the malware can be detected and blocked from entry. Once again these distributions are also dependent upon current alert level. If the payload passes through the firewall, it is then handled by the internet-access service 1258 request ingress 1261 access point. This access point has a probability where the service asks the user if they wish to allow the unpacking of the content and the user then denies it.

From this point, the user is no longer directly involved in the insertion of the trojan onto the workstation. Once permitted, the internet service then unpacks the content and delivers it to the operating system 1262. This traversal contains a probability that the internet-access service 1258 will detect the payload and refuse to deliver it. In the event that this fails, the anti-virus service 1264 will scan the payload 1266 to determine if it contains malware. There is a probability that the signature of the payload is recognized and is intercepted. If the anti-virus scan passes the malware, it is then passed to the operating system service 1268. First this service checks to see if the installation of the payload is authorized 1270. The fact that not all users can install software is reflected in the probability distribution for this access point. Next, the system attempts to deliver the payload 1272. This access point's probability distribution reflects the chance that the operating system detects the malware signature in the payload and blocks it. If the malware survives all of these detections, the system unpacks the payload and attempts to activate the trojan 1276 running on the trojan service 1274. There is a primary probability that the malware was not compatible with the system and is not installed. There is also a second probability distribution describing the possibility that the malware does install but breaks the system and kills all of the services on the workstation—effectively making it unusable.

Now, the computation process is used to assess the network security posture in a manner similar to that described in Examples 1 and 2. Specifically, the probability distributions are divided up and run using the previously described Monte Carlo system, resulting in a report containing a set of predicted vulnerabilities as well as any other values that may be produce in aspects of the invention.

The interplay between all of these distributions is rather complex and therefore the result is difficult to predict. Having said that, attacks of this nature are often successful. Moreover, they are not that technically sophisticated to create. Thus, it is important to provide a quantitative description of the likelihood of such an attack's success. However, this example should start to make it clear to anyone skilled in the art, that providing a quantitative analysis for a given network, without this system would be a significant undertaking. In fact, it may not even be tractable for most evaluations.

Example 4

Figure 13:
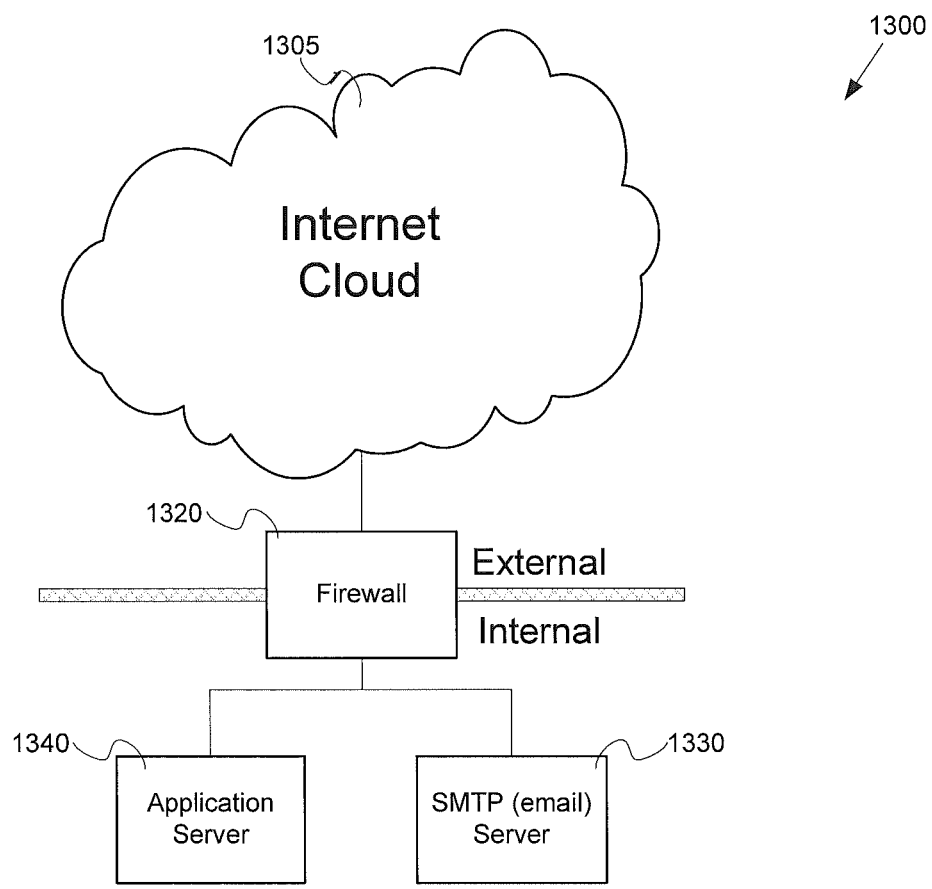
FIG. 13 illustrates an example network used to model a distributed denial of service attack against a secured network containing an application and email service.

This example entails a distributed denial of service (DDOS) attack aimed at the simple network shown in FIG. 13. This type of attack involves the saturation of target services with requests. The goal is to cause the service to become unresponsive to legitimate requests or even to crash. The example network has three possible targets: a firewall, an application server, and an email server.

Figure 14:
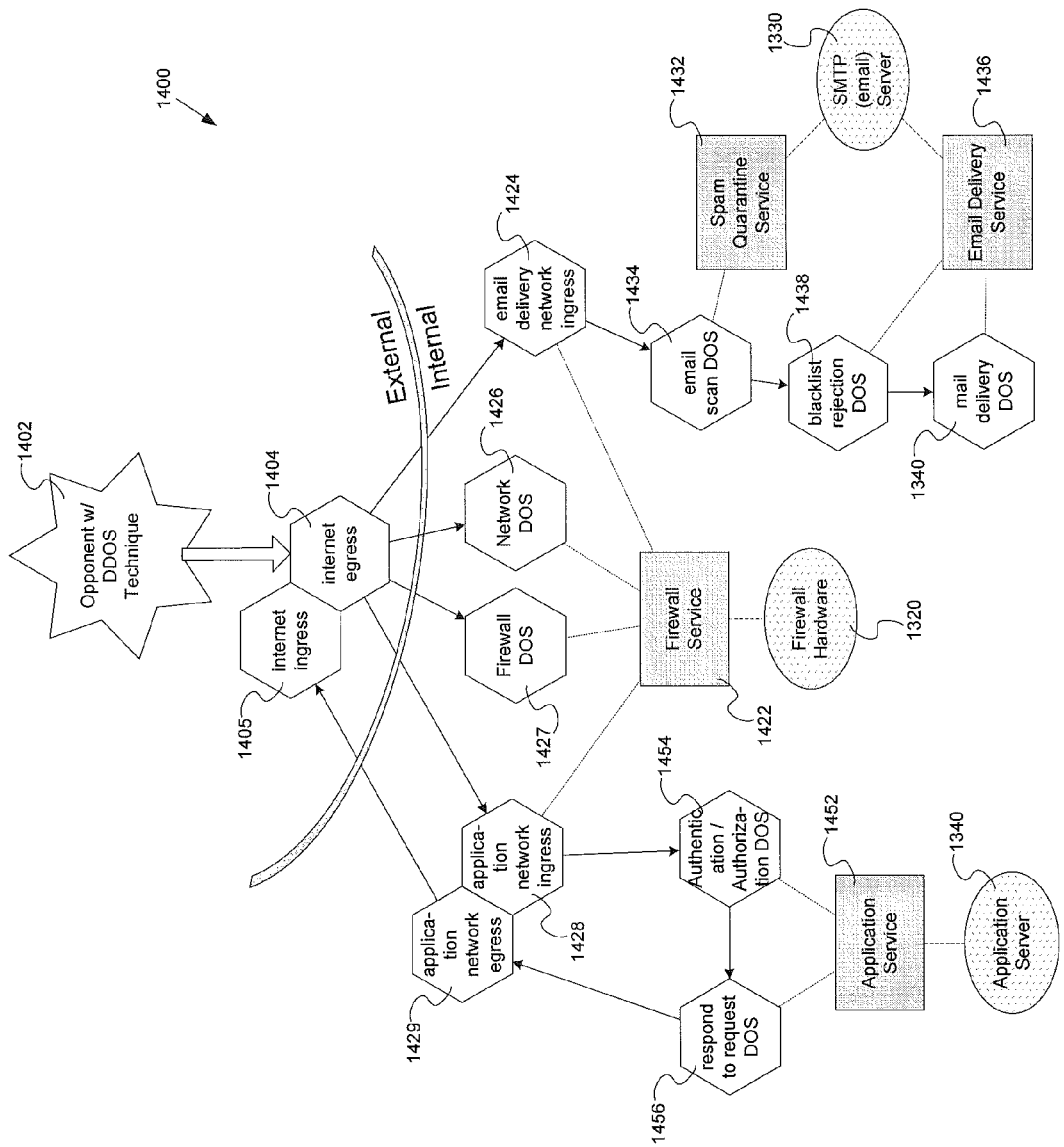
FIG. 14 is an example model of a distributed denial of service attack against the network shown in FIG. 13.

This example is unique in that it requires the concerted effort of a large number of systems to cause the denial of service. If there are too few actors, the administrators of the network can act to block the malicious actors. However, as the number and distribution of these actors becomes more widespread, blocking them would be tantamount to denying service to legitimate users. These attacks can be undertaken by the exceptionally large number of systems containing trojans under the control of a single opponent. This type of attack is effective against all but the most sophisticated systems. This example, like the previous one, will avoid the assignment of example values to the probability distributions because the calculation of any results is too difficult to briefly describe even with simplified assumptions. FIG. 14 requires minimal additions to the opponent catalog. In particular, we would create an opponent with a DDOS technique 1402. The DDOS technique is characterized by two key probability distributions: the first distribution describes the frequency of the connections applied to a site; the second distribution describes the duration of the attack. In addition to the distributions, a significant number of additions are required to the cyber reference library to support all of the DDOS service-access points in the model.

There are four separate targets where the opponent may attack. The most obvious attack is against the network DOS access point 1426 associated with the firewall service 1422. Traversal of this access point is dependent upon the probability that the requests coming into the firewall are able to overwhelm the network bandwidth. This is related to the frequency in number of connections per second associated with the DDOS technique. If the frequency of the technique exceeds the randomly drawn capability of the access point, the attack succeeds and all services behind the firewall are impacted. The duration of the denial of service is determined by the time distribution of the DDOS attack technique. Secondly, a firewall DOS 1427 could overwhelm the firewall service itself. This access point behaves in much the same way as the network DOS. That said, firewall hardware 1320 typically can handle a higher number of connections than the internet connectivity so these distributions will likely tolerate higher frequencies.

The opponent also has the ability to affect a DDOS against the application service 1452. In this situation, the opponent will enter the secured network through the application-network ingress 1428. Because the application is open to the public, this access point only restricts traversal to blacklisted IP addresses. Unfortunately, the distributed nature of the attack makes it impossible to use this function. After traversing this entry, the opponent may then connect to the application service 1452 through the authentication/authorization DOS access point 1454. This access point has a frequency threshold. The value of this threshold is dependent on the scalability of the application. While it is not shown in this model, if the underlying authentication and authorization process for the application refers to an external system such as Microsoft's Active Directory there must also be additional multi-component DDOS access points defining those paths. If the opponent has the ability to authenticate, then the application service must respond to the request. The application response DOS 1456 access point, like the authentication/authorization, also depends on the scalability of the application. The probability distribution describing the frequency threshold should take into account the types of response expected and the resulting load on the system with respect to memory, CPU, disk, and other system-resource usage patterns. Once the response has been created, it traverses the application-network egress 1429 firewall access point and then goes through the internet ingress 1405. Both of these access points should provide unfettered traversal. Yet, there is no issue when the opponent is able to traverse the entire application path without triggering a denial of service threshold. It is only when a particular threshold is exceeded that the application becomes unresponsive for the duration specified by the DDOS technique.

The opponent might also choose to focus the DDOS attack onto the email server 1330. This case involves the sending of a significant number of messages to the targeted server. The messages must pass through the firewall service's email delivery network ingress 1424. This access point limits access based upon IP addresses. However, this approach is not effective against a DDOS attack; most messages will pass through unfettered. Next, the message is passed to the email scanning DOS 1434 access point on the spam quarantine service. Once again, the probability of traversal predominantly depends on the frequency of the messages. However, determining if a message is spam, or if it contains a malicious payload, can be resource intensive and therefore the probability distribution specific to this service depends on its scalability. If the message passes, it is then sent to the blacklist rejection DOS 1438 access point. The probability of traversal is based upon the frequency as well as the size of the blacklist. Many blacklists are small, so the frequency required to cause a denial of service at this point would be quite high. Finally, the message is passed to the mail delivery access point 1340. A successful denial of service at this point relies on overwhelming the resources made available to the email server 1330. For example, an attack might rely on limited space or throughput available to the storage disks. The frequency of the attack and a likely size of the average message will determine the probability distribution for this access point. Any traversal that exceeds the specified denial of threshold will cause the system to become inoperable for the associated time duration of the attack.

In some embodiments, the DDOS technique might be split into skill levels with varying degrees of success. Higher skill attacks might involve email messages that are specifically designed to take a significant amount of time to scan. Similarly, the messages might be made large enough to fill up the disk on the email server while still not being rejected by size. The requests to the application server might be specifically designed to require large amounts of memory and/or CPU to fulfill. Conversely, lower skill attacks would not take these considerations into account.

Once again, the computation process is used to assess the network security posture in a manner similar to that described in Examples 1 and 2. Specifically, the probability distributions are divided up and run using the previously described Monte Carlo system, resulting in a report containing a set of predicted vulnerabilities as well as any other values that may be produce in aspects of the invention.

This example shows how a distributed denial of service attack might be modeled. Clearly, a complete DDOS model must take into account every service in a network whether it is exposed through a firewall or not. In fact, it is trojans or viruses are well known for the ability to create denial-of-service attacks behind a firewall.

Example 5

Figure 15:
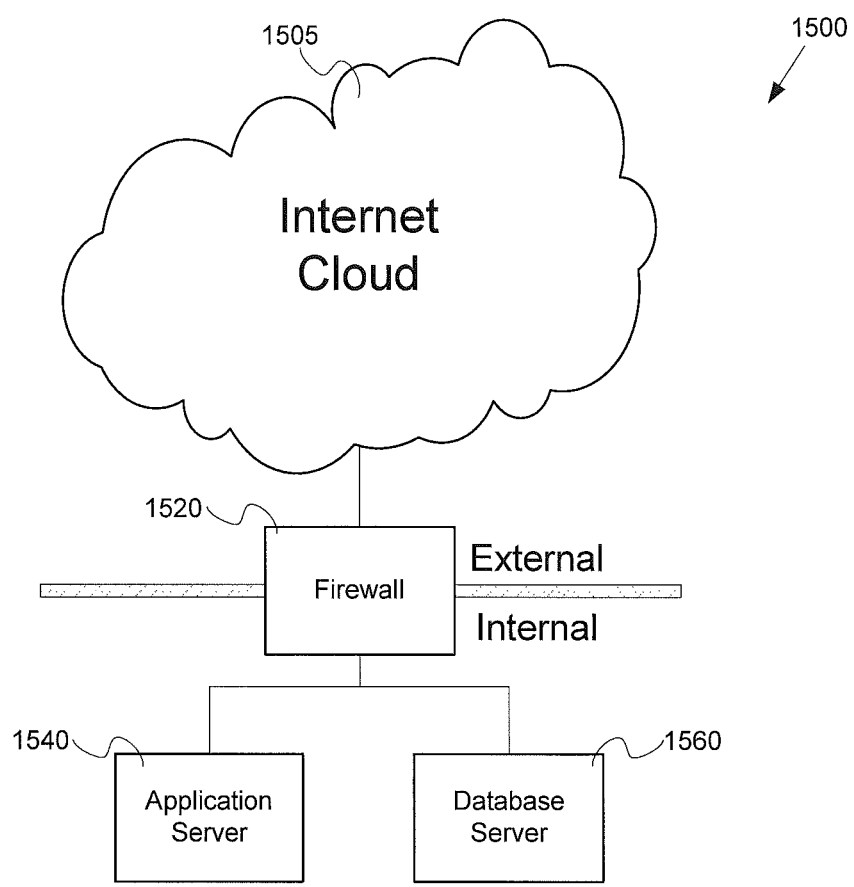
FIG. 15 is an example network containing a business application secured by a firewall. The firewall also prohibits access to the database from which the application server retrieves the target data. This network will be used to describe a series of models (FIG. 16 through FIG. 22)

The diagram shown in FIG. 15 illustrates a representation of a very simple network containing a database-backed business application. In particular, this network contains a firewall 1520 connected to the internet 1505 externally, and both an application server 1540 and database server 1560 connected internally. The firewall should not allow access from the external network to the database server. The target on this network is the data held within the database server. This network is used in examples 5 through 10 to illustrate how an analyst might compile variations of a model with the ultimate goal of properly characterizing the security profile of the network.

Figure 16:
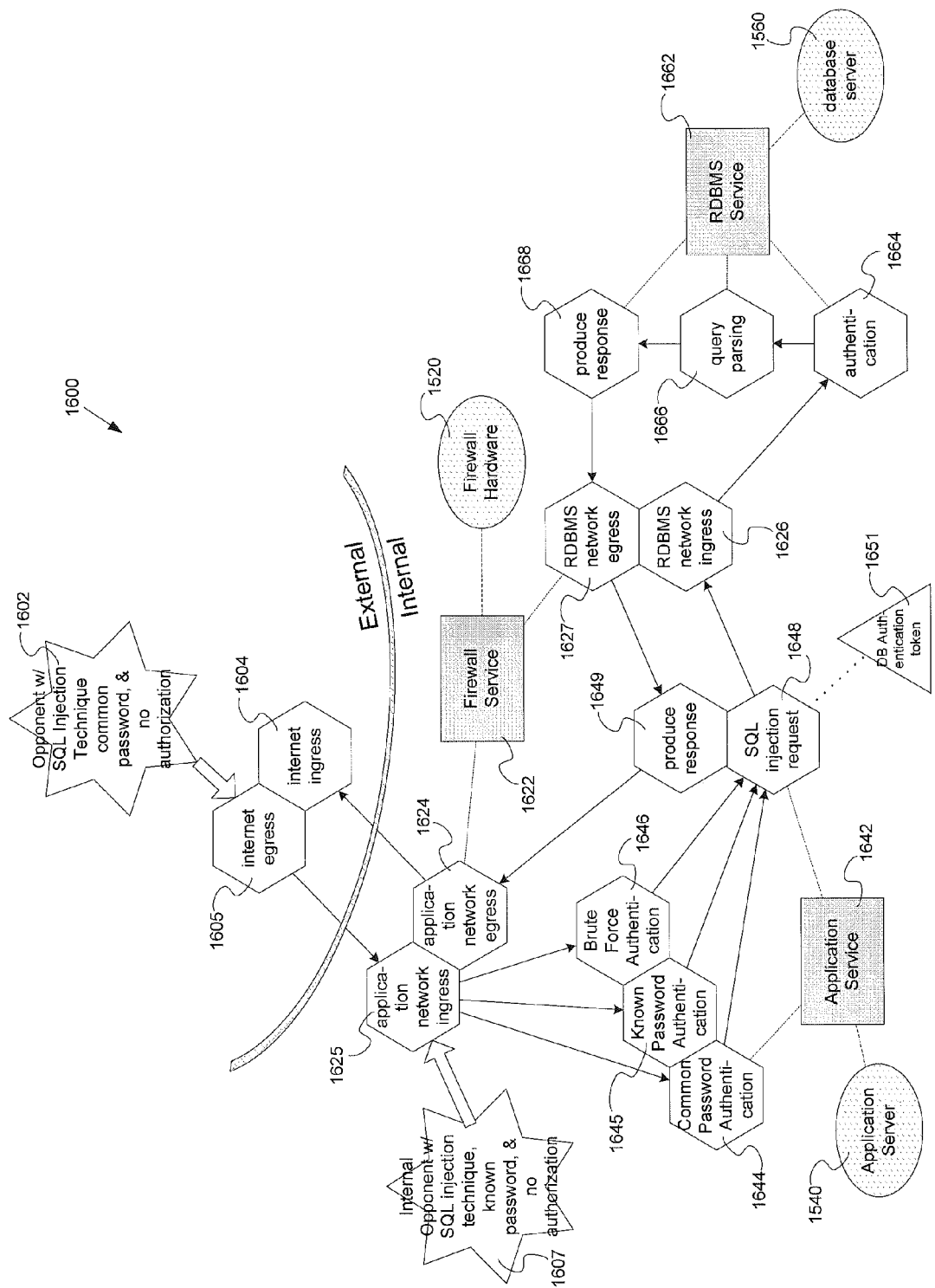
FIG. 16 is an example model of a SQL-injection attack against the network shown in FIG. 15.

The example model shown in FIG. 16 illustrates a SQL-injection attack aimed at the simple network shown in FIG. 15. This is a multi-component attack that requires the opponent to go from the request phase 1648 through to the response 1649 without deviation. Opponents who wish to use this approach must possess the SQL-injection technique. This model contains two very general opponent representations: an external user who lacks both authentication, as well as authorization rights, to access the target data 1602, but has a common password available to them; and an internal user who has authentication, but lacks authorization rights to access the target 1607. That said, the model could have just as easily have included other permutations of these illustrative opponents. For example, the external and internal users could switch between common and known passwords or either could be reduced to using brute-force techniques to obtain access to the application. These opponents were omitted for brevity's sake. Those skilled in the art could easily deduce their paths to the target given those that are provided.

The opponent entering the network from the external side of the firewall 1602 begins at the internet egress access point 1605. Three are no restrictions to traversing this point. Next, they would connect to the firewall service 1622 through the application-network ingress access point 1625. Because this network expects connections from the outside, traversing this access point will only have a small, if any, chance that the location from which the opponent originates is blocked as a nefarious point of origin. Next, the opponent has a choice between traversing the common password authentication access point 1644 or the brute-force authentication access point 1646. Refer to Example 1 for in-depth discussions of the probability of traversal for these two access points respectively.

Once the opponent has authenticated and discovers that they are not authorized to access the target data, they must then attempt to traverse the SQL injection request access point 1648 of the application service 1642. Several factors dictate whether this is possible. First, there is some probability that the application is hardened against this technique. There is also a chance that subsequent changes to the application are not. This second probability is based upon the particular policies and procedures enforced by the business. A key advantage of attempting a SQL injection is that authorization to view data is often handled at the application service 1642 rather than by the targeted relational database service 1662. As such, any valid query passed to the database service can provide unauthorized data access. Yet, even if this is not the situation, there is some probability that the authorization at the database layer has been misconfigured. All of these factors must be considered when creating the set of probability distributions that will define the likelihood of traversal of this access point. Because the user has already authenticated and applications rarely, if ever, require a user to authenticate both at the application and the database layers because of usability concerns, successful traversal provides the opponent a one-time use database authentication token 1651.

Next, the opponent must traverse the relational database management system (RDBMS) network ingress 1626 on the firewall service 1622. Some firewall service implementations have a chance of detecting SQL-injection attempts and subsequently blocking them. Otherwise, the traversal should be unhindered. Next, the database opponent must pass through the authentication access point 1664. As the opponent will have the authentication token 1651, traversal will be unopposed. Next, the injected query is delivered to the RDBMS service for parsing 1666. Traversing this access point has a probability distribution defining the chance that an opponent has properly posed a query that can be fulfilled. This is because the opponent likely does not know either the type of RDBMS used or the underlying data structure. If the query compiles, the RDBMS produces a response 1668. There is a given chance that the data produced in this response contains the target information the opponent requires. Also, this access point may log the queries that are logged and therefore any detection, were it to occur, would be here. The data is then passed through the RDBMS network egress 1627 access point on the firewall service 1622. Some firewalls are able to detect data that they do not wish to have traverse such as social security numbers or credit-cards. Consequently, there is a given likelihood that the response could be intercepted and halted. It is unlikely that the firewall would halt this transmission at this point. Next, the application incorporates the result into a web-page response 1649. There is some probability that the data will corrupt the response and therefore it will not be delivered. Finally, the web-page is passed through the firewall service using the application-network egress access point 1624. The firewall is much more likely to block any unacceptable data transmission to the external network at this point than when it was transferred to the application server. If the response is not blocked, it then is passed over to the internet ingress 1604 signaling that the attack was successful.

The opponent entering the network from the internal side of the firewall 1607 begins at the application-network ingress 1625. There should be no prevention of an internal user from reaching the application. Next, the opponent uses their known password gear to traverse the known-password authentication access point 1645. There is a slight chance that this password has expired and therefore that the opponent can traverse this access point. The multi-component portion of the attack starting at the SQL-injection request access point 1648 and proceeding through the produce response access point 1649 proceeds in the same way as the other opponent. Finally, the response passes through the firewall service 1622 application-network egress access point 1624. In some configurations, the firewall service could block any unacceptable data transmissions to the internal network. However the chance of this is slight and therefore the opponent will likely obtain the target data.

Now, the computation process is used to assess the network security posture in a manner similar to that described in Examples 1 and 2. Specifically, the probability distributions are divided up and run using the previously described Monte Carlo system, resulting in a report containing a set of predicted vulnerabilities as well as any other values that may be produce in aspects of the invention.

This example shows how a SQL injection attack might be modeled. A complete model of the network on which this attack took place must take into account every service present in the network whether it is exposed through a firewall or not. This multi-component attack traverses several services and is a good introduction into how these sorts of attacks might proceed.

Example 6

As with Example 5, the diagram shown in FIG. 15 illustrates a representation of a very simple network containing a database-backed business application. In particular, this network contains a firewall 1520 connected to the internet 1505 externally and both an application server 1540 and database server 1560 connected internally. The firewall should not allow access from the external network to the database server. The target on this network is the data held within the database server. This network is used in examples 5 through 10 to illustrate how an analyst might compile variations of a model with the ultimate goal of properly characterizing the security profile of the network.

Figure 17:
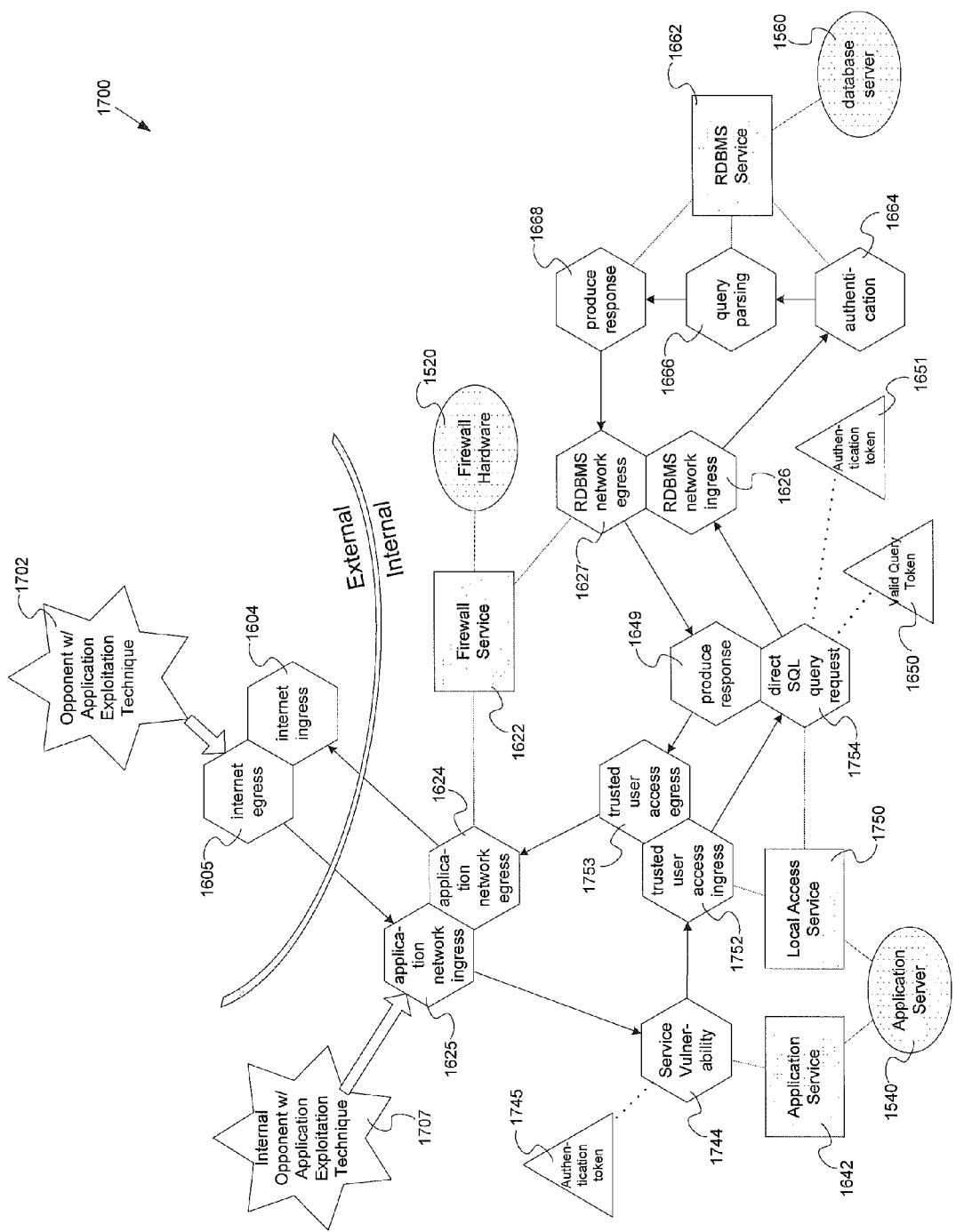
FIG. 17 is an example model of an attack leveraging an application vulnerability for the network shown in FIG. 15.

The example model shown in FIG. 17 illustrates how an opponent might take advantage of a vulnerability in the application service 1642 displayed in FIG. 15. Any number of vulnerabilities might exist in the application service. These could be modeled independently or they might be placed into groups defined by the analyst. Similarly, there might be one technique that allows opponents to leverage a vulnerability or there could be several individual techniques applicable to specific vulnerabilities. For simplicity, we will assume that there is but one vulnerability available to the opponent.

Opponents who wish to use this approach must possess an application exploitation technique. In particular, this model contains an external and an internal opponent representation.

The opponent entering the network from the external side of the firewall 1702 begins at the internet egress access point 1605. Three are no restrictions to traversing this point. Next, the opponent must connect to the firewall service 1622 through the application-network ingress access point 1625. Traversing this access point will only have a small, if any, chance that the location from which the opponent originates is blocked as a nefarious point of origin. The opponent from the internal side of the network 1707 will also enter at this point. The chance that the opponent is blocked is even slimmer in this instance.

Next, either of the opponents must attempt to use the exploitation technique against application service 1642 through the service vulnerability 1744. The probability that these opponents can traverse this is primarily based upon the chance that a known vulnerability is available to the opponent. The policies and procedures implemented by the network administrator strongly influence the traversal probability functions. For instance, a policy that requires patching of vulnerabilities weekly versus a policy that enforces daily patching would have dramatically different probabilities of traversal. In fact, because there is a usually some lag time between when a vulnerability is discovered and when opponents have created a means to exploit it. Thus the daily patching scheme will likely have minimal impact while the weekly patching schedule should have a much higher probability of exposure. The notable exception to this difference is an opponent with a zero-day exploit as this impacts all policy sets. Procedures are also instrumental in setting the traversal probabilities. Consider a network whose policy is to patch all security vulnerabilities within 24 hours of their release that has no process in place to identify when security updates have been released or which network elements require said patches. Similarly, network operations center that is staffed Monday through Friday likely has no means to adhere to the policy when a patch is released over the weekend. Finally, the probability distribution must consider the quality control applied to as well as the history of the issues associated with the application service 1642. A system with a history of vulnerabilities that have been successfully exploited will directly influence the probability of traversal. That said, an application service with no published history of vulnerabilities is not a guarantee that the system is not routinely exploited particularly if it is an application that does not undergo routine security verification and validation tests.

Once the service vulnerability 1744 has been traversed, the opponent is provided with an authentication token 1745. Essentially this represents the ability of an opponent who has passed this access point to have privileged access to the application service 1642. Accordingly, the opponent will then use the local network access service 1750 to gain access to the target database. First, the opponent uses the trusted user access ingress access point 1752, across which there are no barriers to traversal, to create a direct SQL query request 1754. If the username and password are stored unencrypted on the application server 1540, as is often the case, then traversing this access point should not be hindered. However if the username and password are encrypted or collected from the user by the application, then reaching the target will require the use of paths not pertinent to this example. We shall assume that the username and password are freely available in this instance. Thus the opponent will pass through the direct SQL query request access point 1754 and can therefore obtain both a one-time use database authentication token 1651 as well as a valid query token 1755. The query token essentially assumes that the opponent can interact with the RDBMS service 1662 to obtain database definition information. This will then allow the opponent to guarantee that the query is valid.

Next the opponent attempts to traverse the firewall service's 1622 RDBMS network ingress access point 1626. Because the request is originating from the application server 1540, there is no reason for the firewall to limit access to the database server 1560. The opponent then easily traverses the RDBMS service's 1662 authentication access point 1664 using the DB authentication token 1651 followed by the query parsing access point 1666 using the valid query token 1755, and then ultimately the produce response 1668 access point. This last access point would be where RDBMS service 1662 based detection of unauthorized queries would take place if it were part of this example. The response is then passed through the RDBMS network egress 1627 on its return trip through the firewall service 1622. Certain firewall hardware 1520 systems have the capability to detect certain types of data such as credit card or social security numbers. Thus, there is a small chance that the response returning to an internal service might be blocked. If the response is not blocked, it is passed onto the trusted user access egress access point 1753 where it is unopposed and then sent to the application-network egress access point 1624 on its way to the external side of the firewall service 1622. There is a higher probability that unauthorized data might be detected and blocked at this point than the internal communication path. If the data is not blocked, the response is transmitted to the internet ingress 1604 access point.

As before, the computation process is used to assess the network security posture in a manner similar to that described in Examples 1 and 2. Specifically, the probability distributions are divided up and run using the previously described Monte Carlo system, resulting in a report containing a set of predicted vulnerabilities as well as any other values that may be produce in aspects of the invention.

This example shows how a service vulnerability exploit might be modeled. A complete model of the network on which this attack took place must take into account every service present in the network whether it is exposed through a firewall or not. This multi-component attack is a good introduction into how easy reaching a target becomes once a key service has been exploited.

Example 7

As with the previous two examples, the diagram shown in FIG. 15 illustrates a representation of a very simple network containing a database-backed business application. In particular, this network contains a firewall 1520 connected to the internet 1505 externally and both an application server 1540 and database server 1560 connected internally. The firewall should not allow access from the external network to the database server. The target on this network is the data held within the database server. This network is used in examples 5 through 10 to illustrate how an analyst might compile variations of a model with the ultimate goal of properly characterizing the security profile of the network.

Figure 18:
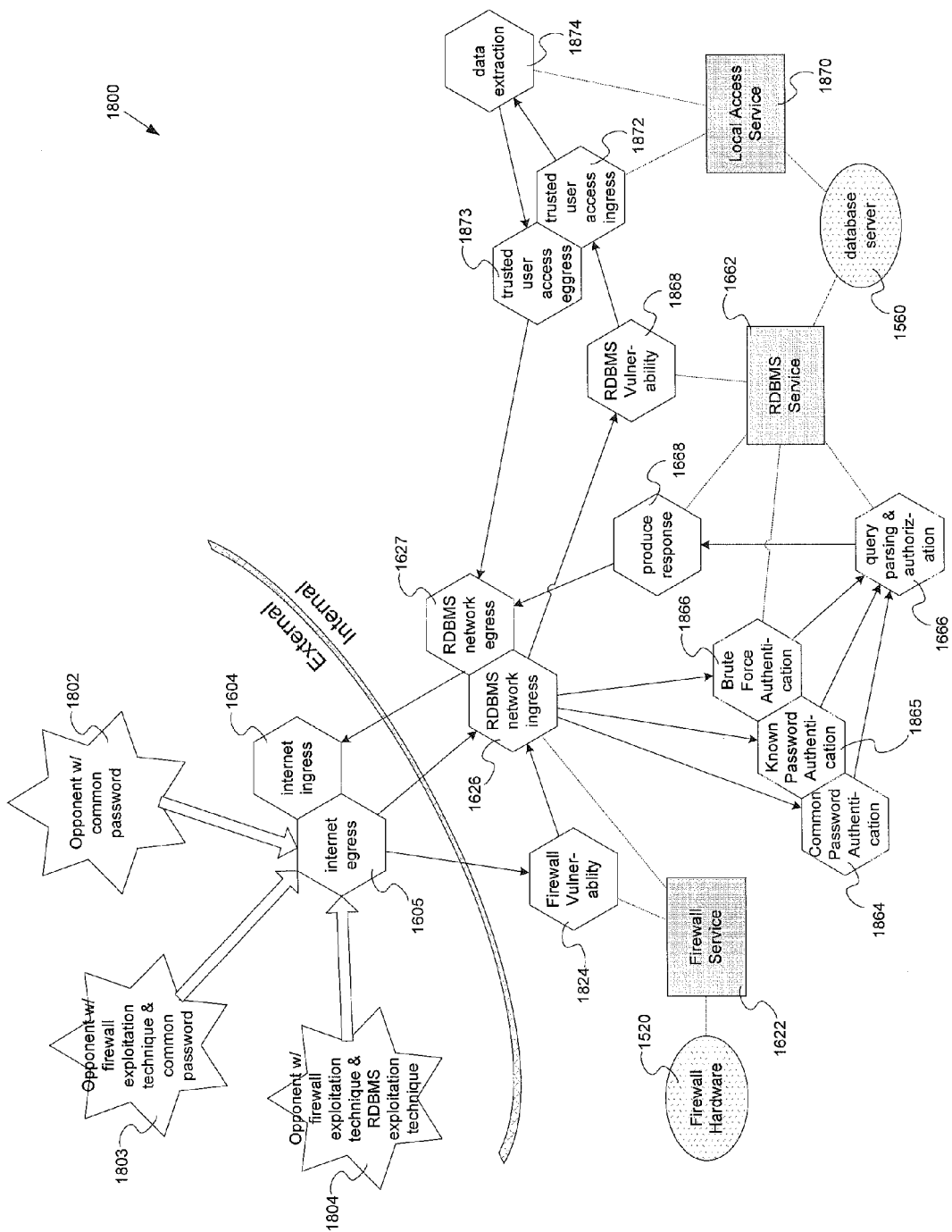
FIG. 18 is an example model of an attack leveraging a vulnerability in the firewall for the network shown in FIG. 15. In addition, it allows the use of a vulnerability in the database server once the attacker is internal to the firewall. Finally, it also accommodates a misconfiguration in the firewall that allows external access to the database server.

The example model shown in FIG. 18 illustrates how an opponent might take advantage of a vulnerability or misconfiguration in the firewall service 1622 operating on the firewall hardware 1520 displayed in FIG. 15. Moreover, once the opponent is behind the firewall, they might take advantage of a relational database management system (RDBMS) vulnerability rather than authenticating and authorizing to obtain the target data.

Like the application service in the previous example, any number of vulnerabilities might exist in the firewall service. These could be modeled independently or they might be placed into groups defined by the analyst. Similarly, there might be one technique that allows opponents to leverage a vulnerability or there could be several individual techniques applicable to specific vulnerabilities. For simplicity, we will assume that there is but one vulnerability available to the opponent. The misconfiguration represents a failure by the network administrator to properly block ingress into and out of the RDBMS service 1662.

Opponents who wish to use a vulnerability in the firewall service must possess a firewall exploitation technique. Opponents who wish to use the RDBMS vulnerability must possess a RDBMS exploitation technique.

This particular example model contains three opponents. The first opponent 1802 is outfitted with a common password but relies on accidental openings in the firewall to use it against the RDBMS service 1662. The second opponent 1803 has a firewall exploitation technique and is outfitted with a common password. Variants of either of these opponents that could have a known password or no password at all could have also been modeled but were omitted for brevity. Others skilled in the art could derive how these opponents might traverse to the target using information from previous examples. The third opponent has both the firewall and an RDBMS service exploitation technique. All three opponents will be entering the network from the external side of the firewall.

The opponent relying on the chance that the firewall has a misconfiguration allowing ingress and egress to the RDBMS server enters the network from the internet egress access point 1605 on the external side of the firewall 1520. Three are no restrictions to traversing this point. Next, the opponent must connect to the firewall service 1622 through the RDBMS network ingress access point 1626. The probability that this access point is open is based upon which procedures, if any, does the network administrator have in place to validate that the firewall is behaving as expected. Creating firewall rule sets is a complex task that can easily go awry. A simple validation after every rule change is implemented can easily prevent mistakes that allow unintended access.

If the opponent is lucky enough to slip through the firewall, they must authenticate against the RDBMS service 1662 either via the common-password authentication 1864 or the brute force authentication 1866 access points. Refer to Example 1 for in-depth discussions of the probability of traversal for these two types of access points respectively. Once the opponent has authenticated, they must submit a query for parsing and authorization 1666. The likelihood of traversing this access point is related to the chance that a given user is authorized to query the authorized data as well as the chance that the specified query is valid. In the previous two examples, there was no authorization because it was assumed that the application credential was authorized to query any data located in the target database. Namely, the application itself would limit what the user could query. However, the common password obtained by the opponent has a given probability distribution describing the chance that the user is authorized to either query the data or to describe the data structure itself. Thus there is also a given probability that the opponent is unable to formulate a valid query. If the opponent fashions a valid query that obtains the targeted data, a response is produced 1668. There is no restriction on traversal of this access point, however, if detection based upon unusual queries were present, it would occur here.

Next, the response must pass through the firewall service's 1622 RDBMS network egress access point 1627. The probability that the firewall is configured to allow a response from the database server 1560 is significantly higher than ingress because many network administrators never expect a user to slip in to begin with. Still, there is a limited probability that the firewall might detect specific data such as credit-card or social security numbers and block the data. Once the response has cleared this hurdle it is passed to internet egress access point 1604 and the attack is successful.

The second opponent 1803, uses the firewall exploitation technique rather than relying on a misconfiguration to gain access to the network. The main difference between this approach and that of the previous opponent is that they must traverse from the internet egress 1605 to the firewall vulnerability 1824 and then to the RDBMS network ingress 1626. The probability of traversing this vulnerability, like the application vulnerability in the previous example, is dependent on the chance that a known exploit is available to the opponent. Please see the discussion in Example 6 for detail on how the probability distribution might be set.

The third opponent 1804 starts off the along the same path as the second 1803 but instead of attempting to authenticate after traversing the RDBMS network ingress 1626, it moves onto the RDBMS vulnerability access point 1868 on the RDBMS service 1662. Once again, the probability of traversing this vulnerability is similar to the analysis described in Example 6. If the opponent is able to traverse this access point, they are given privileged-user access to the database server 1560. Thus, the opponent traverses the trusted user access ingress access point 1872. If there were a host-based intrusion detection system on this server, this might be where the opponent might be detected.

Next, the opponent proceeds to use their access to the database server to perform data extraction 1874 against the database. This might entail taking backup files, taking the actual database files, using a privileged account to automatically connect to the database, or any other activities that somebody skilled with extracting data from a relational database might use. Each of these activities could be separated into individual access points in parallel to the existing one. Indeed, each of these parallel access points might require its own set of techniques or its own gear to traverse. For simplicity's sake, we will assume that this access point is easily traversed because the opponent has unchallenged privileged-user access to the database. Next, the data is passed through the trusted user access egress 1873 where it will encounter no barriers to traversal. Finally, the data is passed through the firewall service's 1622 RDBMS network egress access point 1627. Like the previous two opponents, there is a small chance that the data is detected and blocked from being transported out to the internet egress access point 1604.

The computation process is used to assess the network security posture in a manner similar to that described in Examples 1 and 2 as was done in the previous example. Specifically, the probability distributions are divided up and run using the previously described Monte Carlo system, resulting in a report containing a set of predicted vulnerabilities as well as any other values that may be produce in aspects of the invention.

This example shows how a firewall vulnerability exploit or misconfiguration might be modeled. In addition, it explores how a vulnerability in the RDBMS service would affect an opponent without authentication credentials. That said, a complete model of the network on which this attack took place must take into account every service present in the network whether it is exposed through a firewall or not. This attack is a good introduction into the effects that a misconfiguration may have upon a network's defense.

Example 8

Once again, the diagram shown in FIG. 15 illustrates a representation of a very simple network containing a database-backed business application. In particular, this network contains a firewall 1520 connected to the internet 1505 externally and both an application server 1540 and database server 1560 connected internally. The firewall should not allow access from the external network to the database server. The target on this network is the data held within the database server. This network is used in examples 5 through 10 to illustrate how an analyst might compile variations of a model with the ultimate goal of properly characterizing the security profile of the network.

Figure 19:
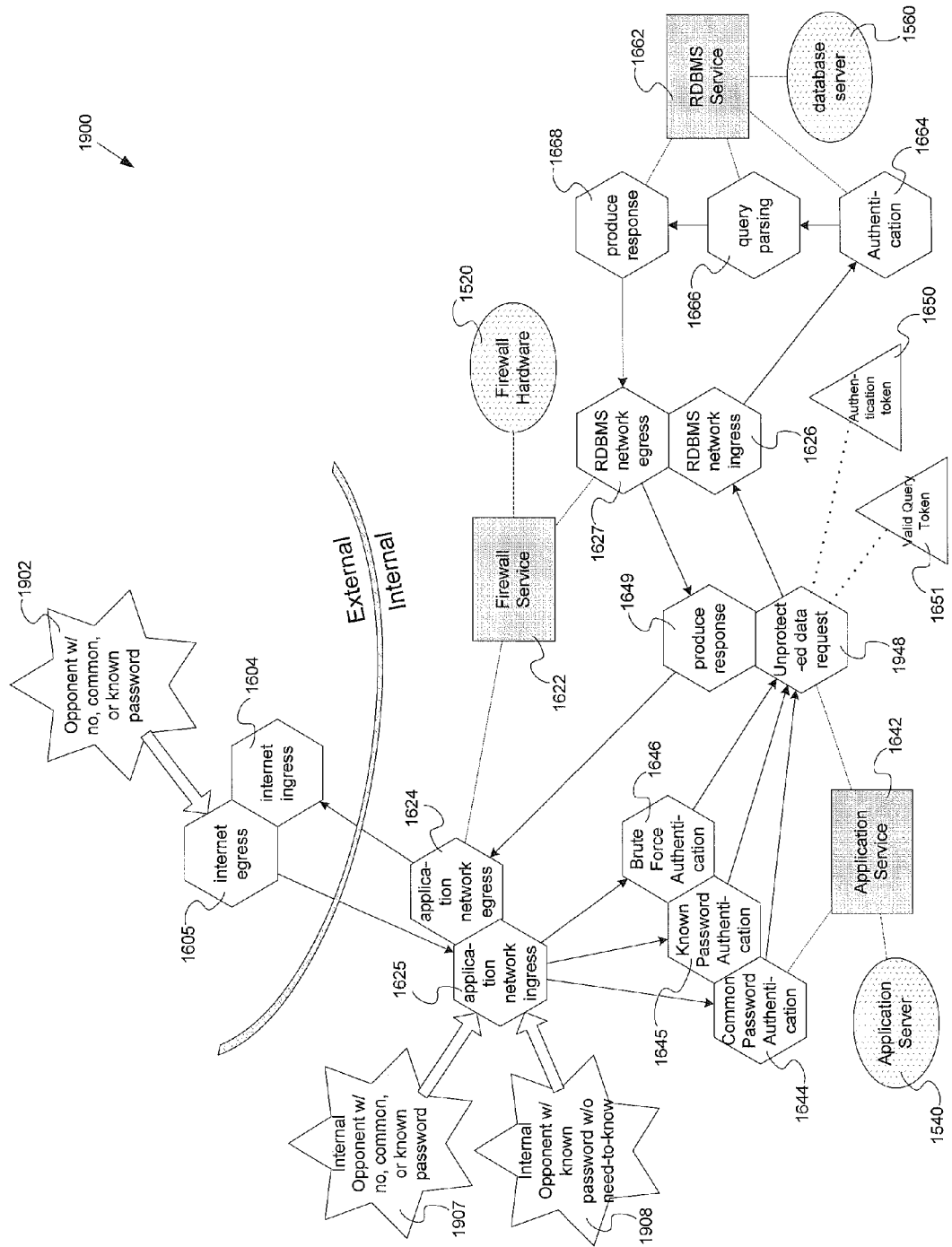
FIG. 19 is an example model of an application server that does not enforce authorization controls for the network shown in FIG. 15.

The example model shown in FIG. 19 illustrates how an opponent can leverage the lack of authorization controls in the application service 1642 operating on the application server 1540 displayed in FIG. 15. It is a common practice for application developers to avoid access-control in favor of allowing all authenticated users access to all data. Instead, there is a trust that all users of the application will restrict their activities to data for which they have a need to know. Opponents who wish to use to obtain unauthorized access to the target data simply need to authenticate.

This particular example model contains three opponents. The first opponent 1902 is an external user outfitted with a common password. The assumption here is that the application is available to external users who are able to authenticate. The second opponent 1907 is an internal user outfitted with a common password. In fact, it is possible that the application administrator inadvertently allowed the user access to the application because they chose to use a centralized authentication system. The last opponent 1908 is capable of using the application but is limited by policy from accessing much of the data stored therein.

The opponent 1902 coming from the external side of the network starts at the internet egress access point 1605 and first enters the network at the application-network ingress access point 1625. There is a slight chance that the source address of the opponent has been blocked and therefore will prevent its traversal. Next, the opponent must authenticate against the application service 1642 either via the common-password authentication 1644 or the brute force authentication 1646 access points. Refer to Example 1, for in-depth discussions of the probability of traversal for these two types of access points respectively.

If the opponent is able to authenticate, then the remainder of the access points are relatively easy to traverse due to the lack of any authorization controls. Accordingly, the opponent immediately traverses the unprotected data request access point 1948 on the application service 1642. At this point, the opponent is outfitted with a valid query token 1755 and a database authentication token 1651. With this gear, the opponent is able to easily pass through the RDBMS network egress access point 1627, RDBMS authentication 1664, query parsing 1666, response production 1668, and then to the RDBMS network egress 1627. The firewall service 1622 has the ability to detect restricted data but since the request comes from an internal location the chance that it will be blocked at this access point is negligible. The data is then used by the application service 1642 to produce a response 1649. A network administrator could use application logs for identifying unauthorized data accesses; however this example does not include any detection. The response is then transmitted through the application-network egress access point 1624. There is a slight probability that the unauthorized data might be detected by the firewall service 1622 while traversing this point. If this does not occur, the response is transmitted to the internet ingress access point 1604 and the attack succeeds.

The internal opponent with a common password 1907 follows the same path as the external opponent 1902 except that there is no chance of being blocked by the firewall service 1622 when traversing the application-network ingress 1625 or egress 1624 access points.

The last opponent, an insider with a known password yet who lacks a "need to know" for key target data 1908, follows the same path as the previous opponent. However, instead of having to navigate the common-password authentication 1644 or brute-force authentication 1646 access points, they are able to pass through the known-password authentication access point 1645. Traversal of this point is almost certainly guaranteed. The only hindrance would be if their password were revoked which might occur, for example, if the opponent were to represent employees who are leaving the company and might seek to steal the target data that they are no longer authorized to access. Similarly, this opponent might represent a user who is expected to access very specific data but who abuses the trust placed on them to obtain confidential information for personal use. There is almost no defense that can be mounted against accesses by this opponent in this model.

Again, the computation process is used to assess the network security posture in a manner similar to that described in Examples 1 and 2. Specifically, the probability distributions are divided up and run using the previously described Monte Carlo system, resulting in a report containing a set of predicted vulnerabilities as well as any other values that may be produce in aspects of the invention.

This example shows how an application lacking authorization controls might be modeled. In particular, it illustrates how an insider threat can easily obtain restricted data when no controls are placed on whether a person needs to access it. Moreover, it illustrates how opponents without access might gain "insider" access by using intelligent guesses for any one of the system's valid users. Of course, a complete model of the network on which this type of data access takes place must take into account every service present in the network whether it is exposed through a firewall or not.

Example 9

The diagram shown in FIG. 15, as before, illustrates a representation of a very simple network containing a database-backed business application. In particular, this network contains a firewall 1520 connected to the internet 1505 externally and both an application server 1540 and database server 1560 connected internally. The firewall should not allow access from the external network to the database server. The target on this network is the data held within the database server. This network is used in examples 5 through 10 to illustrate how an analyst might compile variations of a model with the ultimate goal of properly characterizing the security profile of the network.

Figure 20:
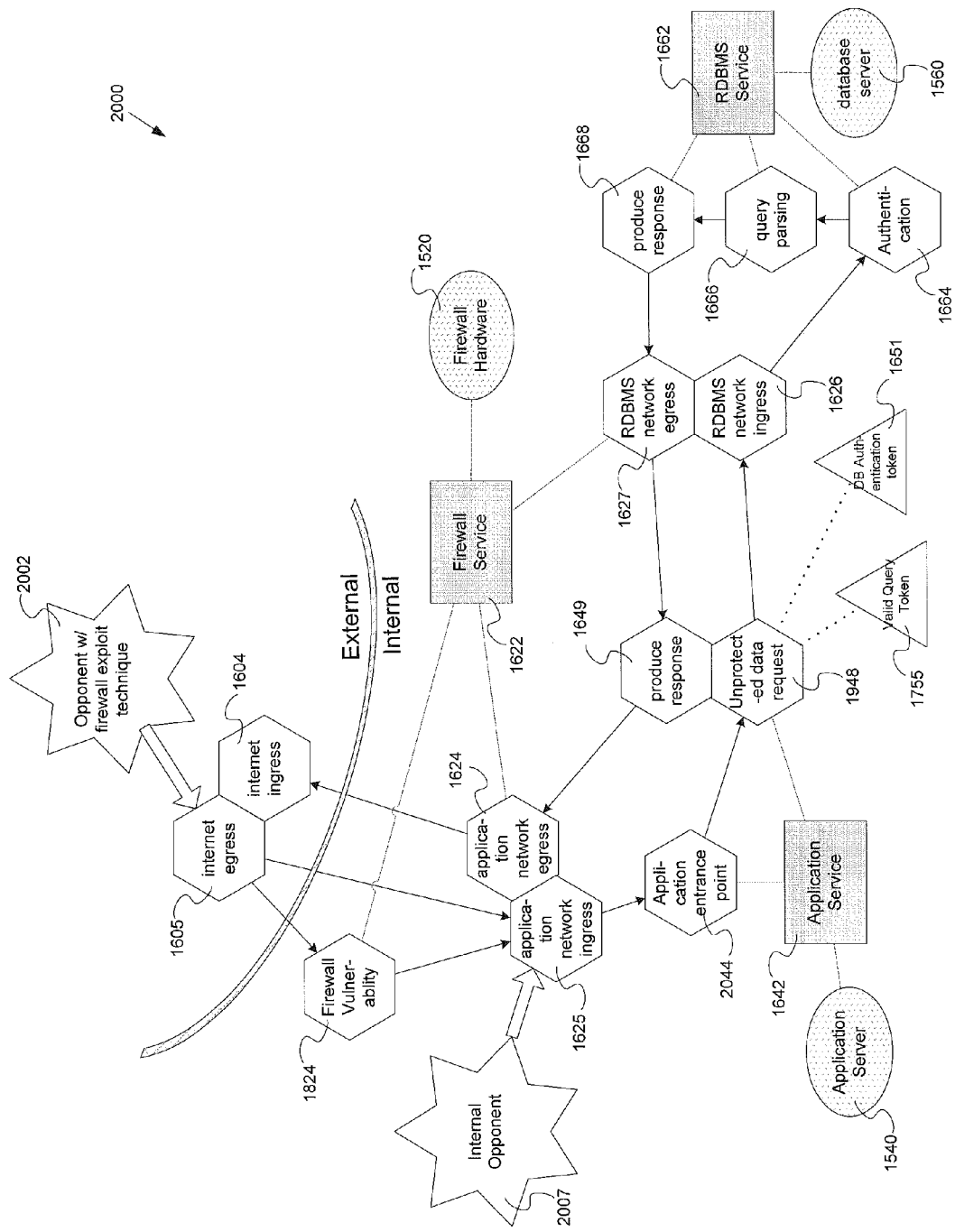
FIG. 20 is an example model of an application server that does not enforce authentication controls for the network shown in FIG. 15. The lack of controls on the application presumes that the firewall will provide adequate protection from unauthorized users. As such, this example allows misconfiguration or the vulnerability in the firewall.

The example model shown in FIG. 20 illustrates how an opponent can leverage the lack of authentication controls in the application service 1642 operating on the application server 1540 displayed in FIG. 15. Applications often avoid authentication control when it is presumed that the firewall will prevent unauthorized access. Opponents who wish to obtain unauthorized access to the target data simply need to gain access to the internal network and locate the application.

In this particular example, the model contains two opponents. The first, an opponent with a firewall exploit technique 2002, must breach the firewall to gain access to the internal network. There are many easier approaches to obtaining access through the firewall that effectively make the user appear as an insider. Rather than describe those in detail, the second internal opponent 2007 will be used to represent the end goal of those entry points.

The external opponent 2002, uses the firewall exploitation technique rather than relying on a misconfiguration to gain access to the network. They start at the internet egress 1605 and move to the firewall vulnerability 1824. The probability of traversing this access point is dependent on the chance that a known exploit is available and then many other considerations come into play. Please see the discussion in Example 6 for detail on how the probability distribution might be set.

If the external opponent gets behind the firewall, then they are able to modify the rules to allow access into the network. The opponent proceeds to the application-network ingress access point 1625. This is also the starting point for the internal opponent 2007 which represents both valid internal users and external opponents who have gained access to the network through other means (e.g. installation of a trojan).

The opponents can then proceed to the application entrance point 2044. As there is no authentication for the application, the opponents can then choose an unprotected data request 1948 to perform. There can be no authorization for this request because the opponent has not authenticated and therefore there is no barrier to traversal. Subsequently the opponents obtain a valid query token 1755 as well as a database authentication token 1651. The opponents can then proceed through the RDBMS network ingress 1626, RDBMS service's 1662 authentication 1664, query parsing 1666, response production 1668, RDBMS network egress 1627, the application service's 1642 response production, and the application-network egress 1624 access points without hindrance. The internal opponent has successfully reached the target at this juncture while the external opponent must exit the network to reach the internet egress 1604. The firewall exploit executed previously allows all data to pass without issue. However, if the external opponent entered the network without a firewall exploit, the application-network egress 1624 could detect the data leaving the network and block it.

As before, the computation process is used to assess the network security posture in a manner similar to that described in Examples 1 and 2. Specifically, the probability distributions are divided up and run using the previously described Monte Carlo system, resulting in a report containing a set of predicted vulnerabilities as well as any other values that may be produce in aspects of the invention.

This example shows how an application lacking authentication and authorization controls might be modeled. In particular, it illustrates how an insider threat can easily obtain restricted data when no controls are placed on it. Again, a complete model of the network on which this type of data access takes place must take into account every service present in the network whether it is exposed through a firewall or not.

Example 10

This example is the last to use the very simple network containing a database-backed business application shown in FIG. 15. In particular, this network contains a firewall 1520 connected to the internet 1505 externally and both an application server 1540 and database server 1560 connected internally. The firewall should not allow access from the external network to the database server. The target on this network is the data held within the database server. This network is used in examples 5 through 10 to illustrate how an analyst might compile variations of a model with the ultimate goal of properly characterizing the security profile of the network.

Figure 21:
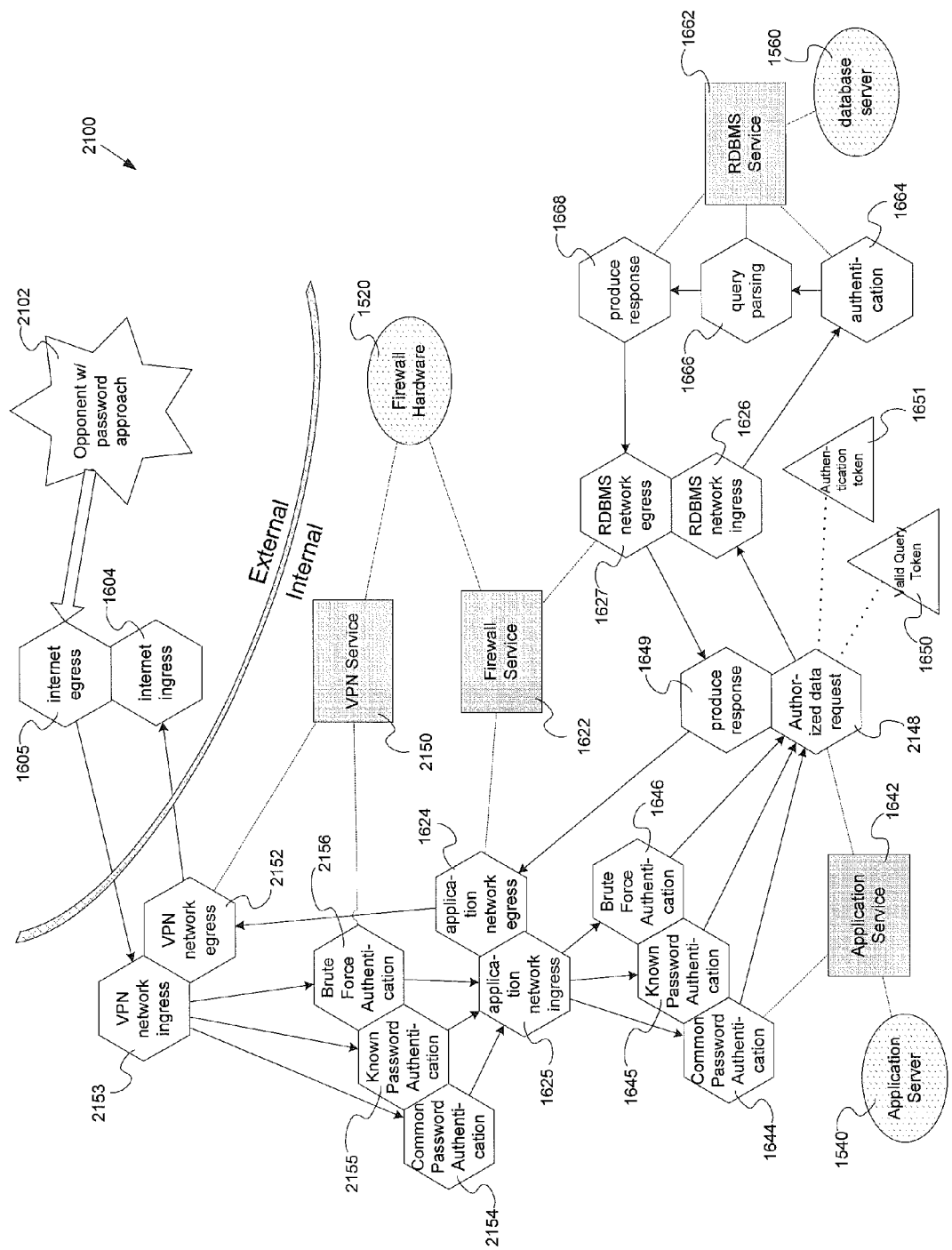
FIG. 21 is an example model of a VPN (virtual private network) service that provides limited access from the external to the internal side of the firewall.

The example model shown in FIG. 21 illustrates how an opponent might take advantage of virtual private network (VPN) to gain access to the internal side of the network shown in FIG. 13. While it is possible to exploit a vulnerability in the VPN, this example will focus on using authentication to gain access to the network. One opponent who has the ability to use any of the three password techniques 2102 is modeled.

The opponent starts from the internet egress access point 1605 and immediately attempts to traverse the VPN service beginning with the VPN network ingress 2153. Depending on the type of VPN, a security certificate, specific client, presence of a file, and any number of other checks might be required to connect. Moreover, the VPN may block opponents from specific source addresses. For this example, we will assume a basic service that does no special checks. The opponent then moves to the one of the three authentication access points: common password 2154, known password 2155, and brute-force 2156. Detailed descriptions of the probabilities of traversing of each of these are located in Example 1. Often times, a VPN service will authenticate against a directory server in order to provide single sign-on amongst a number of systems on the network including the application service 1642. If this is the case, the opponent would obtain an authentication token that could be used to traverse the known-password authentication 1645.

Once authenticated with the VPN, the opponent can traverse the application-network ingress access point 1625 without obstruction. The opponent must then authenticate against the application service 1642. Again, the opponent could follow any one of the three authentication methods: common password 1644, known password 1645, and brute-force 1646. Once again, detailed descriptions of the probabilities of traversing each of these are located in Example 1, The opponent must then make a request for the target data through the authorized data request 2148. The probability of traversing this access point is based on the chance that the credentials used to authenticate are also authorized to access the target data.

If the opponent is authorized to make the query, they are provided a valid query token 1755 and a database authentication token 1651. As a trusted user and with these pieces of gear, the RDBMS network ingress 1626, RDBMS service 1662 authentication 1664, query parsing 1666, response production 1668, RDBMS network egress 1627, application service 1642 response production 1649, application-network egress 1624, and VPN network egress 2152 access points are traversed rather easily and without any chance of failure. Lastly, the opponent traverses to the internet egress 1604 and the attack is complete.

Once again, the computation process is used to assess the network security posture in a manner similar to that described in Examples 1 and 2. Specifically, the probability distributions are divided up and run using the previously described Monte Carlo system, resulting in a report containing a set of predicted vulnerabilities as well as any other values that may be produce in aspects of the invention.

This example shows how an opponent using a VPN to access a network might be modeled. In particular, it illustrates how a VPN makes any external user appear to be an insider by simply authenticating. Of course, a complete model of the network on which this type of data access takes place must take into account every service present in the network whether it is exposed through a firewall or not.

Example 11

Figure 22:
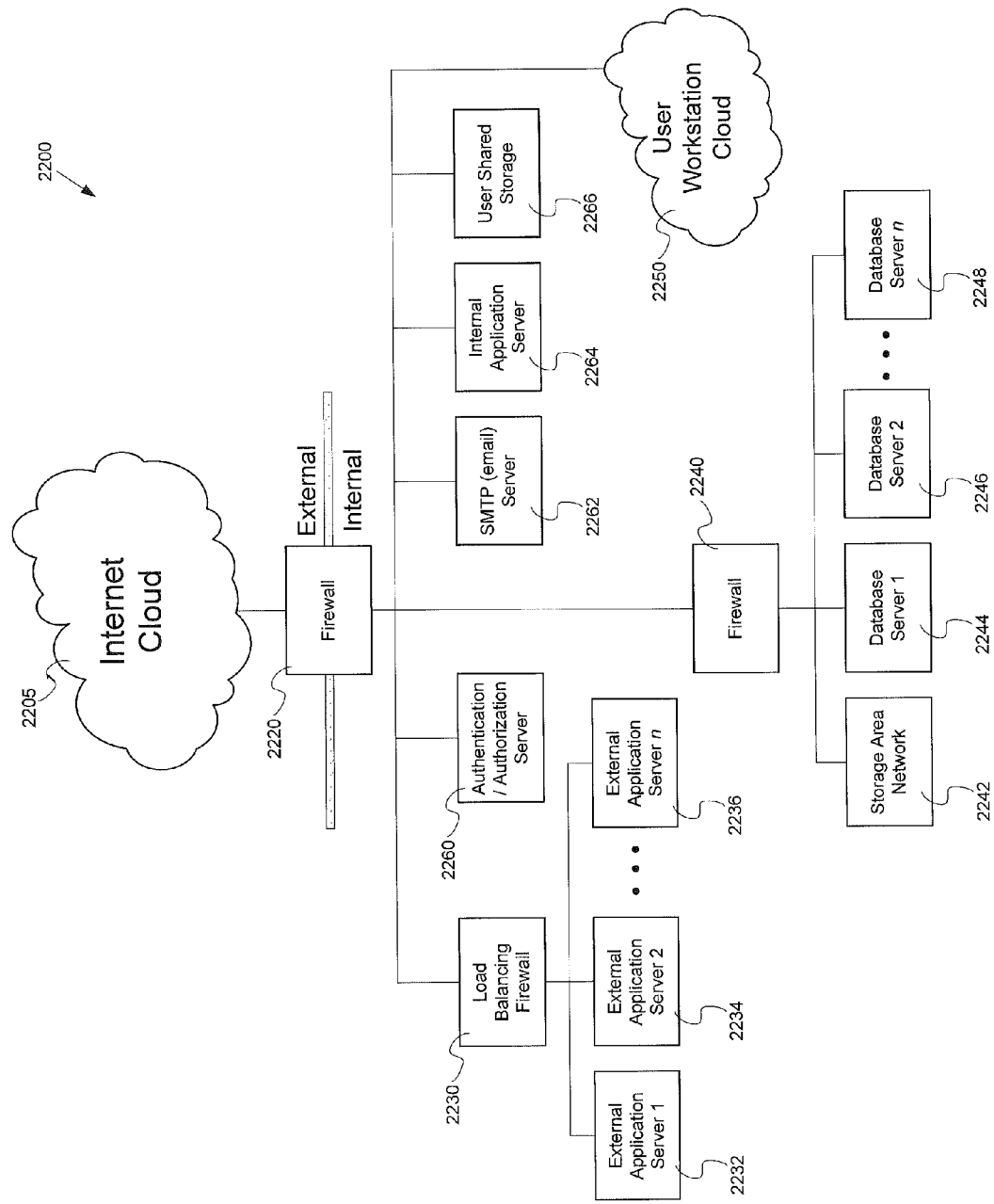
FIG. 22 illustrates an example of network that might be used by a small to medium sized business. This network should illustrate the significant increase in complexity that is necessary to extend the simple examples show in FIG. 9 through FIG. 22.

The network shown in FIG. 22 illustrates a configuration that could easily be seen in a small to mid-sized business. It contains a number of elements, some of which were touched on in previous examples while others are new. Specifically, the network is split into internal operations and those necessary to manage the external interaction with customers.

The key purpose of this example is not to explore the many potential targets and paths leading to them. Rather, it is to emphasize the simplicity of the networks that we explored previously. Enumerating the myriad access points in a reusable library suited for this network is a challenge in itself. Calculating the resultant probability distributions for each of these paths for a set of opponents without the system proposed herein is unimaginably difficult. Yet, the network displayed in FIG. 22 is neither unusual nor particularly large. Larger businesses could easily eclipse this network in number of targets, number of opponent types that might seek to obtain a target, in the diversity of systems in a network, and the shear number of elements present in any one given network.

The scalable application service runs on a set of external application servers 2232, 2234, and 2236. This is where the putative company does its business. In turn this application service connects to a set of databases containing the intellectual property around which the business operates. These databases run on a scalable database service spread across a number of database servers 2244, 2246, and 2248. These databases store their data on a storage area network 2242. The databases and associated storage are protected by a firewall 2240 meant to discourage both external and insider threats.

If the application or database server instances were treated as a single element in the model, it would not adequately describe the probability that one of the systems was configured inappropriately when compared to the others. Consider a case where the cyber reference library 108 might assign a 1% probability to misconfiguration of individual instances of a server group. However, because this event is independent and could happen to each database-server element in the model, the actual probability of this occurring for n servers is additive or n %. If only one of these elements is considered, then this possibility has been discounted significantly.

The firewall 2240 protecting the database server instances will always accept database connections from the set of external application servers 2232, 2234, and 2236. It might also accept database connections from a selected set of internal application servers 2264. Otherwise, the rule sets could vary significantly. There might be an array of different restrictions on which systems and types of connections allowed from networked elements within the workstation cloud 2250. For instance, system and database administrators might be allowed unfettered access to the database servers, certain groups might be allowed reporting access, while the majority of other users will have no access rights whatsoever. Similarly, certain types of connections might be restricted while others are allowed from other internal operation services. A tape-backup application server might have access to either the storage area network 2242 or to the database services themselves.

The internal operations are more diverse than the business pieces. There is an authentication/authorization server 2260 which provides single sign-on and centralized authorization for the employees. Any compromise of the services on this server could provide an opponent with credentials, existing or new, that could be used throughout the network. Additionally, the opponent has the potential of modifying authorization rights for restricted users. Lastly, an opponent could effectively implement a denial of service for any system that uses centralized authentication and authorization.

The network also contains a SMTP server 2262 that provides email and calendaring for internal users. A key entry point for many email services is through mobile device access services that may not be under the control of the network managers. Internal correspondence often contains proprietary and restricted information that an opponent might target. The calendar could be used to deduce key information that could be used to know when key systems might be left unguarded. The opponent could also send messages to others posing as a trusted authority. These messages could easily contain trojans. The opponent might also manage restrictions or rules on the system. For instance, an opponent could have a copy of messages for a particular user unknowingly copied to a location to which the opponent has unrestricted access. Similarly, an opponent might alter the system so that it can be used to send unsolicited spam emails. Last of all, the opponent might also implement a denial of service so that users cannot receive or send emails and calendar events.

Further, the users on the network have access to shared applications that are represented by a single internal application server 2264. In practice, there could be any number of these types of servers providing either stand-alone or shared resources to the user applications. If any of these resources are scalable, they should be represented by multiple elements. One key difference between an internal and external application service is that the implementations are often less security conscientious because it is assumed that the firewall 2220 will provide adequate protection from threats. Another notable difference is that internal application servers are often multi-tenant, meaning that several individual applications are collocated on the same server. In this situation, a security issue within one tenant application could easily be exploited to gain access to another tenant. Moreover, certain applications might require older system libraries that are no longer maintained. Accordingly, no updates will be made to the libraries that address any known vulnerabilities. Again, the firewall is relied upon to prevent the exploitation of these vulnerabilities. If this situation occurs on multi-tenant servers, the other tenants typically must accept this arrangement. Often, the business-line may not even be aware that they are in a risky environment. It is also possible that the internal application server might contain multiple application frameworks on the same system. Thus, any one framework, whether used by all tenants or not, could lead to the subversion of any application on the system. Of course, these scenarios are not restricted to services protected by a firewall. Rather, while less likely, it is quite possible that external facing systems also share these problems.

The network contains user shared storage 2266 that provides users the means to store data centrally. This service is akin to the CIFS service described in Example 1. Please refer to that example for more details.

Finally, there are an indeterminate number of networked devices that may appear on a network. Some networks allow users to connect to a network with any type of personal device while others restrict access to elements specifically known to the network administrators. Many of these devices may be transient: that is they are only present on the network intermittently. A proper model must account for the probability that one of these devices could appear in the network and therefore be used as an entry-point.

Likewise, business lines routinely stand-up test and development environments that are not maintained by the network administrators. These systems often contain some form of restricted data such as a snapshot of a production database environment used for final system validation. An opponent might obtain user credentials or perhaps even the actual targeted information. Further, these environments may not follow the standard policies or procedures mandated for production systems. Accordingly, these environments could expose a wide range of vulnerabilities that a production system simply could not contain. Often times, these environments are implemented on virtualized servers that are instantiated specifically for this purpose. These systems may also be transient such that they are only made available upon demand, say during a product final-candidate release testing cycle. The network model must account for the probability that these systems are available to an opponent.

Example 12

Figure 23:
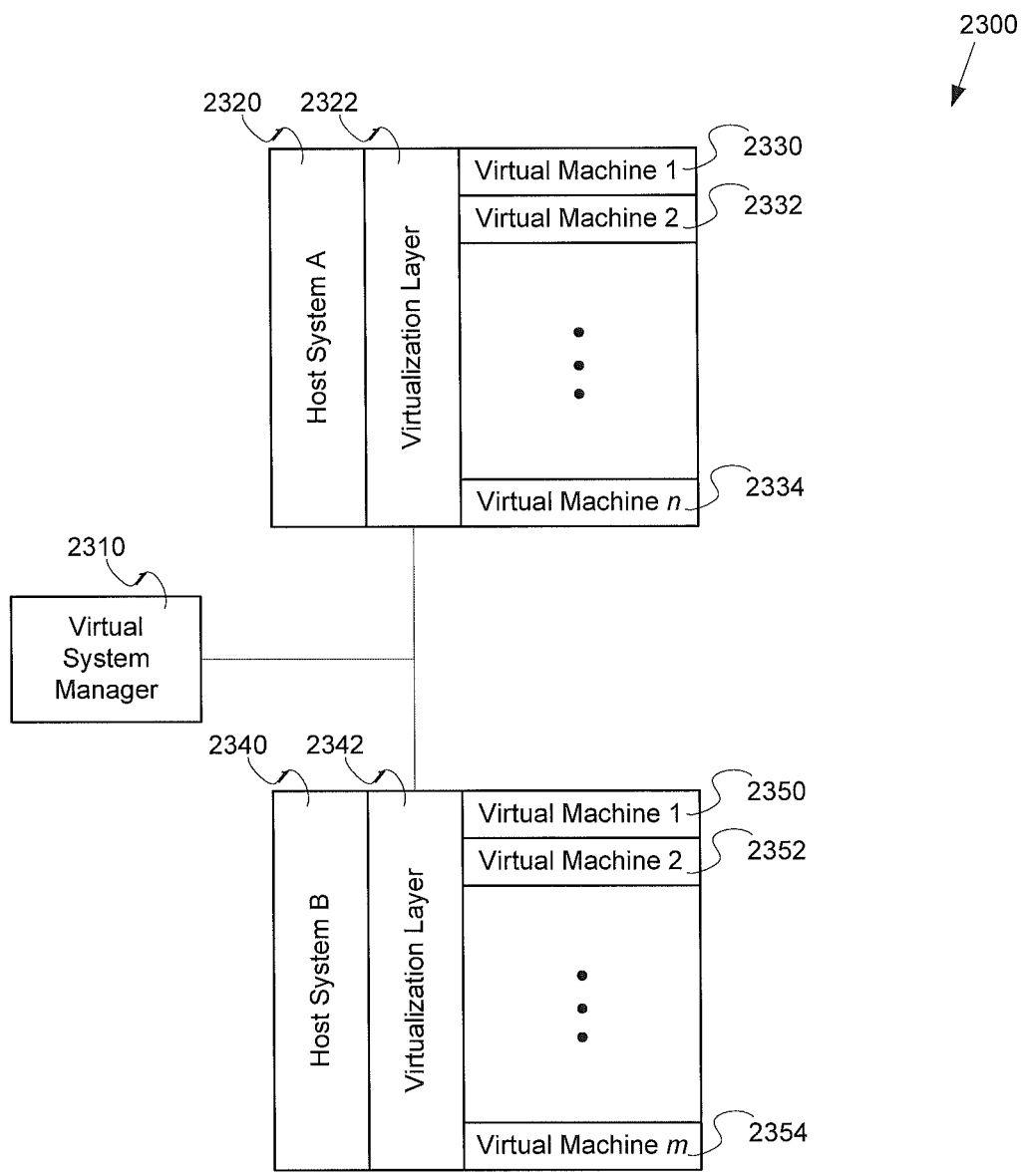
FIG. 23 illustrates an example of a network that could be used by a provider wishing to sell excess computing capacity to customers through a virtual machine provisioning system.

FIG. 23 illustrates an example of a network that could be used by a provider wishing to sell excess computing capacity to customers through a virtual machine provisioning system. These architectures have become popular for cloud and grid computing offerings. The key danger in these environments is how an attacker might leverage implicit trust to cross boundaries from one customer into another.

This simple representative network contains a set of two host systems, 2320 and 2340. A provider may have any number of these systems, each with varying capabilities, available for use. Each host may contain any number of virtual machines, herein displayed as 2330, 2332, 2334, 2350, 2352, and 2354. Each of these virtual systems may contain provider sanctioned or custom operating environments depending on the policies implemented by the owner. Customers are able to instantiate their virtual machines on these host systems using a virtualization layer, 2322 and 2342, that is controlled by a virtual system manager 2310.

This manager controls all of the hosts and the virtual machines operating on them across all network segments present.

As in the previous example, we will again avoid displaying the complex traversal paths that are required to gain access to targets in this type of environment. Rather, we would like to explore at a high-level how the invention could be used to quantify the threats that any customer might realize in this type of environment.

Each customer operating in this environment is likely to have individual operational expectations. Some of these expectations will be enumerated in a service-level agreement with the provider while still others will simply be expected implicitly. In particular, customers have an expectation of performance and system availability. In loosely controlled environments where each customer provides their own custom operating system images to the virtualization layer (e.g., 2322 and 2342), there is no guarantee that these system are secured. Similarly, tightly controlled environments where particular operating system images are made available to the customer may have security issues because of the high-level of availability demanded by the customer does not provide adequate time to bring the virtual machines down for maintenance.

Consequently, an opponent either needs to locate a virtual machine operating environment that contains vulnerabilities or they simply need to start one up depending on the opportunities available to them. Often, the probability of finding or creating these vulnerable systems is remarkably high. The opponent can then use the vulnerabilities to launch attacks against the virtualization layer (e.g., 2322 and 2342) itself. The probability of success for this type of attack is, like the availability of vulnerabilities in the virtual machines, related to the maintenance windows that the provider has on each of its systems. If customers are operating on a particular host for an extended amount of time, this could offer an opponent a significant opportunity to locate a vulnerable system.

Most importantly, once an opponent has gained escalated privileges to the virtualization layer (e.g., 2322 and 2342) on any one host, it provides them access to the virtual system manager 2310. In turn, this privileged access affords the opponent either direct or the information necessary to gain access to any customer's operating environments. Moreover, the implicit trust built into the virtualization layer makes this sort of attack nearly undetectable. Thus, the trust relationship that each customer has with the service provider exposes each of them to the security vulnerabilities found in any one of them.

Creating network models for customers operating in this type of hosted environment simply involves analyzing the service provider's service-level agreements, policies, and procedures. In particular, the goal is to create probabilities of traversal that reflect the amount of time that a vulnerability is likely to be exposed so that attacks can be made against the underlying trusted virtualization layer. Thus, this example demonstrates the applicability of the invention to environments where customers are obtaining computing capacity using virtual machines.

Example 13

Figure 25:
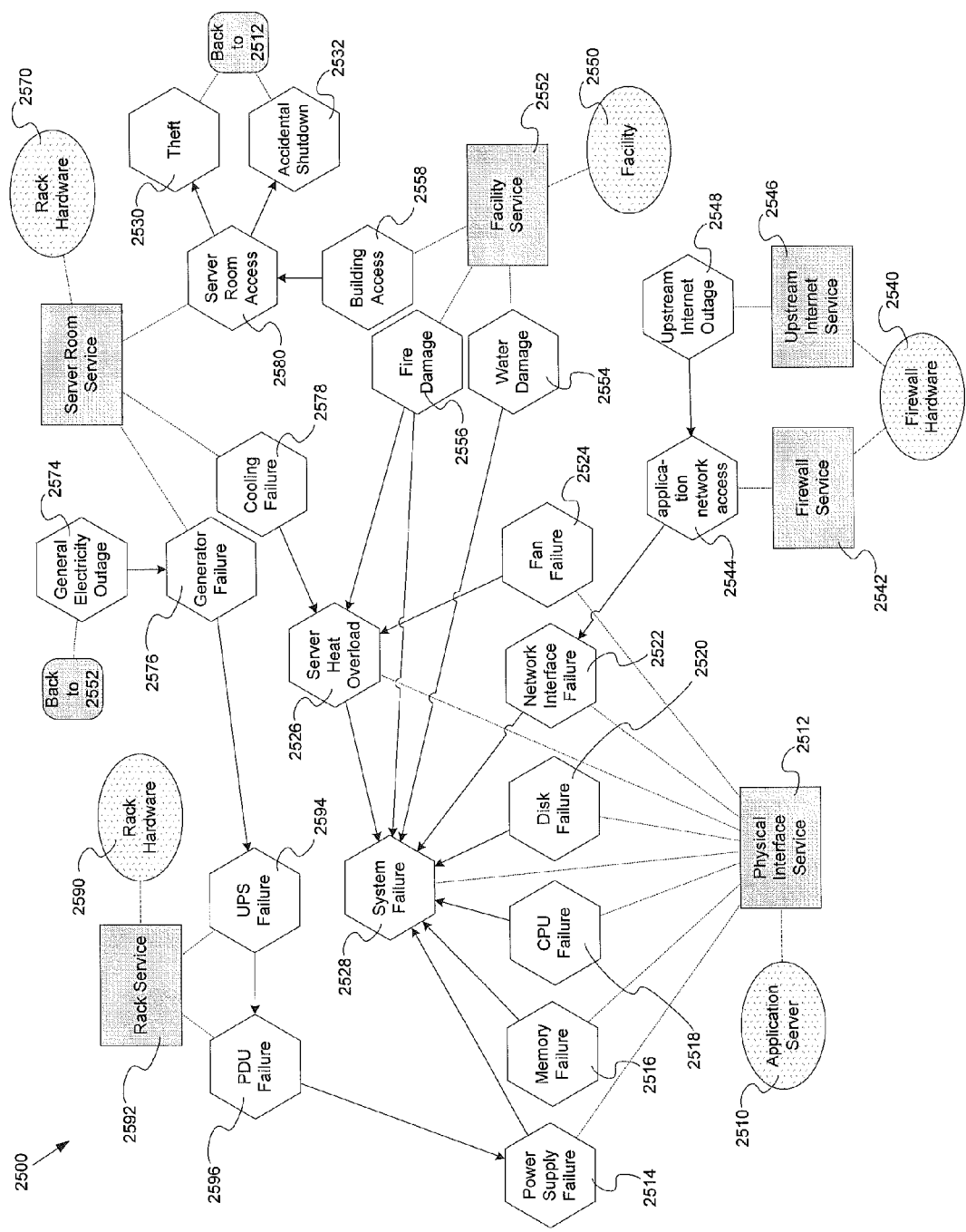
FIG. 25 is an example model of a network of the present invention.

FIG. 25 illustrates an example of a business continuity analysis for a key application server 2500. For simplicity, we will not consider threats to the firewall hardware 2540. This example demonstrates how the invention can be used to calculate all aspects of cyber risk associated with a business operation simultaneously. Performing this analysis is important so that users can evaluate the risk caused by any type of threat and look for scenarios that might mitigate risk from multiple threats simultaneously.

The threats that one could consider which might cause a system failure include but are not limited to mean-time to failure (MTTF), a hurricane, construction work, a facility issue, an insider with server room access, or an outsider with physical access to the facility.

Consider a MTTF threat: this type of threat could enter at any point where wear and tear on a device could lead to failure including 2514, 2516, 2518, 2520, 2522, 2524, 2578, 2594, or 2596. The model would normally have a failure entry point instead of requiring an enumeration, but we left it off for the sake of visualization in the figure. Each of these entry points would have a probability distribution representing the manufacturer's estimate for the likelihood of failure over time. In most cases, successfully traversing one of these entry points is sufficient to cause an outage. However, either a fan failure 2524 or a cooling failure 2578 can lead to overheating of the system yet the system does not fail until a temperature threshold had been met 2526. A probability distribution describing the likelihood of this occurring over a range of times will allow the system to estimate the amount of time before the system fails. A more complex model might include temperature detectors and alarms which allow a response that could avert system failure.

A hurricane threat could enter the model as a general electricity failure 2574, cooling failure 2554, or water damage 2554. Water damage would lead to immediate system failure. A loss of power would also require the generator to fail 2576. This could be affected by the hurricane, running out of fuel over time, or a general failure. If the generator fails, the system is reliant on an uninterruptable power supply 2594. Once that last system fails the model provides a token to the threat which allows the PDU 2596 and the power supply 2514 to fail immediately and subsequently the system. All of the traversal points contain probability distributions describing likelihoods of traversal and may contain some indicating the amount of time required to do so.

A construction threat could lead to the cutting of upstream internet 2548, a general electricity outage 2574, or fire damage 2556. An upstream internet outage immediately leads to a system outage as there are no hindrances to the application network access 2544. The electricity path follows the same route as the hurricane. Fire damage could either lead to a server heat overload 2526 as describe earlier or to the direct system failure (e.g. a gas explosion). Once again, all of the traversal points contain probability distributions describing likelihoods of traversal and may contain some indicating the amount of time required to do so.

A facility issue could lead to a general power outage 2574, water damage 2554, or fire damage 2556. These pathways have been discussed previously. However, they would have different probability distributions for the different threat.

Finally, an insider with server room access or outsider could enter the model at building access 2558. The insider could traverse the building entry 2558 and server room access 2580 without issue. There would be probability distributions describing the likelihood this actor would attempt a theft 2530 or might accidently disrupt service 2532. The outsider would need to get into the building which could depend on the time of day and the alert level at the time of the entry. These properties could be randomly drawn or specified by the user. Once the outsider traversed the building access 2558, they would need to either break into the server room 2580 or attempt to use a credential to gain access. For this simple model, we will ignore the credential and focus on a probability distribution describing the likelihood of a break-in. A more complicated model might include detectors, alarms, and response times. Once inside there is chance that the outsider would choose to take 2530 or interrupt service 2532 to the equipment specific to this service.

This example should demonstrate to anyone skilled in the art that the invention is capable of handling any type of threat to a cyber operation, not just those associated with bad actors.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A system, comprising:
  a memory, configured to store a cyber reference library, an opponent catalog, and a network model,
    the cyber reference library having a plurality of service characterizations, each service characterization from the plurality of service characterizations simulating at least one approach to interact with a service in a network, the network having a plurality of services;
    the opponent catalog having a plurality of opponent representations, each opponent representation from the plurality of opponent representations indicating at least one technique for a threat to gain unauthorized access to a target associated with the service;
    the network model having a plurality of element representations, each element representation from the plurality of element representations defining a plurality of network paths between a plurality of elements in the network during provision of the service; and
  a processor, communicatively coupled to the memory, configured to:
    evaluate each service characterization from the plurality of service characterizations, each opponent representation from the plurality of opponent representations, and each element representation from the plurality of element representations without detecting the threat at the processor, to generate a probability distribution associated with the threat attempting to gain unauthorized access to the target,
    specify a random number of samples to identify a change in the probability distribution based on changes made by a system user or through configurations from the opponent catalog, the cyber reference library, or the network model, to test repeatability of a model,
    adjust the probability distribution based on a plurality of operational alert levels and the model to generate an adjusted probability distribution, and
    send the adjusted probability distribution to a client application causing a number of the unauthorized access to the target to be reduced.

2. The system of claim 1, wherein the at least one technique includes at least one of data leakage attacks, resource depletion, injection, spoofing, time and state attacks, abuse of functionality, manipulation, physical security attacks, network reconnaissance, social engineering, or supply chain attacks.

3. The system of claim 1, wherein the processor is configured to evaluate each service characterization from the plurality of service characterizations, each opponent representation from the plurality of opponent representations, and each element representation from the plurality of element representations based on an algorithm, the algorithm including at least one of a Monte Carlo algorithm, a Bayesian algorithm, or an Evolutionary algorithm.

4. The system of claim 1 wherein said threat includes at least one of a mean-time failure, a failure due to a hurricane, a failure due to construction work, or a facility failure due to a power outage, water damage, or fire damage.

5. The system of claim 1, wherein the processor is configured to adjust the probability distribution based on a likelihood of the threat.

6. The system of claim 1, wherein the processor is configured to adjust the probability distribution based on an impact of the threat.

7. The system of claim 1, wherein the processor is configured to adjust the probability distribution based on a detection of an ongoing attack or a breach.

8. The system of claim 1 wherein the processor is configured to adjust the probability distribution based on a plurality of threat techniques and skill levels.

9. The system of claim 1 wherein the processor is configured to adjust the probability distribution based on an egress of stolen materiel.

10. The system of claim 1 wherein the processor is configured to adjust the probability distribution based on a plurality of detection influencing factors.

11. The system of claim 1 wherein the processor is configured to adjust the probability distribution based on a plurality of operational policies and procedures.

12. The system of claim 1 wherein the processor is configured to evaluate at least one service access point connected to the target by performing a series of steps.

13. The system of claim 12 wherein said series of steps are limited by a specified boundary.

14. The system of claim 12 wherein said series of steps are limited to a probability threshold.

15. The system of claim 12 wherein said series of steps are limited to a risk adjusted impact threshold.

16. The system of claim 12 wherein said series of steps are limited to an amount of time taken in a simulation.

17. The system of claim 12 wherein said series of steps are limited to a specific number of steps.

18. The system of claim 1 wherein a plurality of characteristics associated with the threat include skills, techniques of including signatures, starting gear, or target affinity.

19. The system of claim 18 wherein said starting gear are passwords stolen from an external security domain.

20. The system of claim 1 wherein a plurality of characteristics of the service include, a level of security hardening, processes and policies surrounding the management or use of said service, impacts, security domains, detectors, service states, physical conditions, or a combination thereof.

21. The system of claim 1 wherein the plurality of service characterizations includes inhomogeneity between ingress and egress.

22. The system of claim 1 wherein the cyber reference library or the opponent catalog includes user specified customizations associated with the threat.

23. The system of claim 1 wherein the processor is configured to receive a user specified configuration of the target on a particular date as a benchmark.

24. The system of claim 23 wherein after specifying said benchmark, said user measures changes in said one or more probability of a risk over time caused by changes in a configuration of said network model or a threatscape, wherein said threatscape is defined by the date specific versions of said cyber reference library or a threat catalog.

25. The system of claim 23 wherein after specifying said benchmark, said user measures changes in said one or more probability of a risk against a configuration of said network model which is flagged as a best practice.

26. The system of claim 23 wherein after specifying said benchmark, said user measures changes in said one or more probability of a risk against a range of configurations of said network model in order to evaluate any changes in said range of configurations.

27. The system of claim 1 wherein the processor is configured to evaluate the probability distribution using statistical methods.

28. The system of claim 1 wherein a plurality of targets dynamically change state throughout a simulation because of changes in said one or more probability of a risk.

29. The system of claim 28 wherein said changes in said one or more probability includes a virtualized system, a mobile and other transient system, a data movement through said network model, a data state, a set of data throughput on a particular said network model location, a specific service configuration, a threat target affinity, a threat popular techniques, a threat gear, a physical environment state, a random or attack technique driven service failures, or a combination thereof.

30. A system, comprising:
a memory configured to store information associated with a plurality of threat actors, information associated with a plurality of services, information associated with a plurality of service-access points, and information associated with a plurality of network paths,
the information associated with the plurality of threat actors including information for at least one technique for a threat actor from the plurality of threat actors to gain unauthorized access to a target associated with a service from the plurality of services,
the information associated with the plurality of service-access points including information for each service-access point from the plurality of service-access points being associated with an access point at which a threat actor from the plurality of threat actors reaches to the target,
the information associated with the plurality of network paths including information for each network path from the plurality of network paths being associated with a path through which a threat actor from the plurality of threat actors reaches to a service-access point from the plurality of service-access points; and
a processor, communicatively coupled to the memory, configured to:

evaluate each threat actor of the plurality of threat actors within a network, each service of the plurality of services provided by at least one target, each service-access point of the plurality of service-access points, and each network hop of the plurality of network paths without detecting threats at the processor, to define a probability distribution of threats attempting to gain unauthorized access to the at least one target, the network having the at least one target providing the plurality of services at the plurality of service-access points via the plurality of network paths, specify a random number of samples to identify a change in the probability distribution based on changes made by a system user or through configurations from the plurality of threat actors, the plurality of services provided by the at least one target, the plurality of service-access points, or the plurality of network paths, to test repeatability of a model, adjust the probability distribution based on a plurality of operational alert levels and the model to generate an adjusted probability distribution, and send the adjusted probability distribution to a client application causing a number of the unauthorized access to the at least one target to be reduced.

31. A non-transitory computer-readable medium having computer-executable instructions that when executed, causes one or more processors to:
receive a first data set from an opponent catalog, the first data set having at least one opponent representation describing at least one technique for a threat actor to gain unauthorized access to a target in a network;
receive a second data set from a cyber reference library, the second data set having at least one service characterization simulating at least one service-access point that allows access to a service associated with the target in the network;
receive a third data set from a network model, the third data set having at least one element representation defining an ingress and an egress associated at least one network path between the target and the threat actor during provision of the service;
determine a risk value associated with the threat actor attempting to gain unauthorized access to the target based on the first data set, the second data set, and the third data set without detecting threats associated with the threat actor;
specify a random number of samples to identify a change in the risk value based on changes made by a system user or through configurations from the opponent catalog, the cyber reference library, or the network model, to test repeatability of a model;
adjust the risk value based on a plurality of operational alert levels and the model to generate an adjusted risk value; and
send the adjusted risk value to a client application causing a number of the unauthorized access to the target to be reduced.

32. The system of claim 1, wherein the processor is configured to receive threat alert data from an abnormal state detection system remote from the processor.

* * * * *